(12) United States Patent
Milden et al.

(10) Patent No.: US 10,331,321 B2
(45) Date of Patent: Jun. 25, 2019

(54) MULTIPLE DEVICE CONFIGURATION APPLICATION

(71) Applicant: Apple Inc., Cupertino, CA (US)

(72) Inventors: Kevin C. Milden, San Jose, CA (US); Christopher G. Skogen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 452 days.

(21) Appl. No.: 14/987,557

(22) Filed: Jan. 4, 2016

(65) Prior Publication Data

US 2016/0357421 A1 Dec. 8, 2016

Related U.S. Application Data

(60) Provisional application No. 62/172,219, filed on Jun. 7, 2015.

(51) Int. Cl.
*G06F 3/0484* (2013.01)
*G06F 3/14* (2006.01)
(Continued)

(52) U.S. Cl.
CPC ........ *G06F 3/04847* (2013.01); *G06F 3/0488* (2013.01); *G06F 3/04817* (2013.01); *G06F 3/1423* (2013.01)

(58) Field of Classification Search
CPC ............. G06F 3/04847; G06F 3/04817; G06F 3/0488; G06F 3/1423
See application file for complete search history.

(56) References Cited

U.S. PATENT DOCUMENTS 5,261,044 A * 11/1993 Dev .................... G06F 11/2257
709/223
6,741,853 B1 5/2004 Jiang et al.
(Continued)

OTHER PUBLICATIONS

Tseng, Yu-Chee, "Design and Implementation of a SIP based mobile and vehicular wireless network with Push mechanism," IEEE, Nov. 2007, pp. 3408-3420, vol. 56, can be retrieved at <URL: http://citeseerx.ist.psu.edu/viewdoc/download?doi=10.1.1.459.4731&rep=rep1&type=pdf>.
(Continued)

*Primary Examiner* — Mandrita Brahmachari
(74) *Attorney, Agent, or Firm* — Fernando & Partners, LLP; Prateek Bhatnagar

(57) ABSTRACT

A user interface (UI) of a device configuration application includes a collection view window of device representations with each representation including a screen image that is representative of the configuration state of the corresponding device. The device configuration application UI allows for searching the devices based on their configuration states, and for configuring the devices based on a set of configuration templates displayed in a collection view window. The UI allows for customizing the configuration templates in a device-independent manner, while allowing the user to add a set of configuration rules to each template. The device configuration application provides a method for updating the actual lock screen image of devices by displaying a device identifier on the lock screen. The format of such device identifier includes a device-identifying text string and/or machine-readable code. Displaying a device identifier allows for a more efficient way of cataloging, tracking, and/or configuring devices.

20 Claims, 20 Drawing Sheets

(51) Int. Cl.
*G06F 3/0488* (2013.01)
*G06F 3/0481* (2013.01)

(56) References Cited

U.S. PATENT DOCUMENTS

| | | |
|---|---|---|
| 6,980,660 B1 | 12/2005 | Hind et al. |
| 6,983,424 B1* | 1/2006 | Dutta .................. G06F 3/04817 |
| | | 715/790 |
| 7,263,353 B2 | 8/2007 | Forsberg et al. |
| 7,469,139 B2 | 12/2008 | Van de Groenendaal |
| 7,765,402 B2 | 7/2010 | Clark et al. |
| 7,787,863 B2 | 8/2010 | van de Groenendaal |
| 7,983,419 B2 | 7/2011 | Fan et al. |
| 8,032,409 B1 | 10/2011 | Mikurak |
| 8,056,143 B2 | 11/2011 | Brown et al. |
| 8,208,900 B2 | 6/2012 | Adler et al. |
| 8,214,471 B2 | 7/2012 | Doshi et al. |
| 8,285,197 B2 | 10/2012 | Preiss et al. |
| 8,326,221 B2 | 12/2012 | Dorsey |
| 8,479,267 B2 | 7/2013 | Donley et al. |
| 8,484,464 B2 | 7/2013 | Brown et al. |
| 8,763,089 B2 | 6/2014 | Qureshi et al. |
| 8,904,477 B2 | 12/2014 | Barton et al. |
| 9,027,112 B2 | 5/2015 | Freedman et al. |
| 2004/0199665 A1 | 10/2004 | Omar et al. |
| 2006/0136986 A1 | 6/2006 | Doolittle |
| 2007/0100978 A1 | 5/2007 | Levi et al. |
| 2007/0201384 A1* | 8/2007 | Cunningham ...... H04L 41/0856 |
| | | 370/254 |
| 2007/0250711 A1 | 10/2007 | Storey |
| 2007/0259683 A1 | 11/2007 | Hartikainen et al. |
| 2007/0286159 A1 | 12/2007 | Preiss et al. |
| 2008/0022366 A1 | 1/2008 | Tosey |
| 2008/0022374 A1 | 1/2008 | Brown et al. |
| 2008/0101258 A1* | 5/2008 | Cheng .................... H04L 12/66 |
| | | 370/254 |
| 2008/0148248 A1* | 6/2008 | Volkmer .................... G06F 8/65 |
| | | 717/168 |
| 2008/0189693 A1* | 8/2008 | Pathak ...................... G06F 8/65 |
| | | 717/168 |
| 2008/0310633 A1 | 12/2008 | Brown et al. |
| 2008/0313313 A1 | 12/2008 | Doshi et al. |
| 2009/0031008 A1 | 1/2009 | Elliott et al. |
| 2009/0036111 A1 | 2/2009 | Danford et al. |
| 2009/0222902 A1 | 9/2009 | Bender et al. |
| 2009/0228566 A1 | 9/2009 | Sharp et al. |
| 2009/0249465 A1 | 10/2009 | Touboul |
| 2009/0307280 A1 | 12/2009 | McCarthy et al. |
| 2009/0307333 A1 | 12/2009 | Welingkar et al. |
| 2009/0307715 A1 | 12/2009 | Santamaria et al. |
| 2010/0250946 A1 | 9/2010 | Korte et al. |
| 2010/0299719 A1 | 11/2010 | Burks et al. |
| 2011/0185202 A1 | 7/2011 | Black et al. |
| 2011/0213958 A1 | 9/2011 | Lindholm et al. |
| 2012/0014365 A1 | 1/2012 | Takano et al. |
| 2012/0240183 A1 | 9/2012 | Sinha |
| 2013/0219455 A1 | 8/2013 | Bender et al. |
| 2013/0254291 A1* | 9/2013 | Park ...................... H04L 65/403 |
| | | 709/204 |
| 2015/0106175 A1* | 4/2015 | Kang ................. G06Q 30/0241 |
| | | 705/14.4 |
| 2016/0196048 A1* | 7/2016 | Khoury ............... G06F 3/04845 |
| | | 715/761 |

OTHER PUBLICATIONS

Pashalidis, A., et al, "Secure network management within an open-source mobile agent framework." Mar. 2004, pp. 1-25, can be retrieved at <URL:http://citeseerx.ist.psu.edu/viewdoc/download?doi=10.1.1.63.7296&rep=rep1&type=pdf>.

* cited by examiner

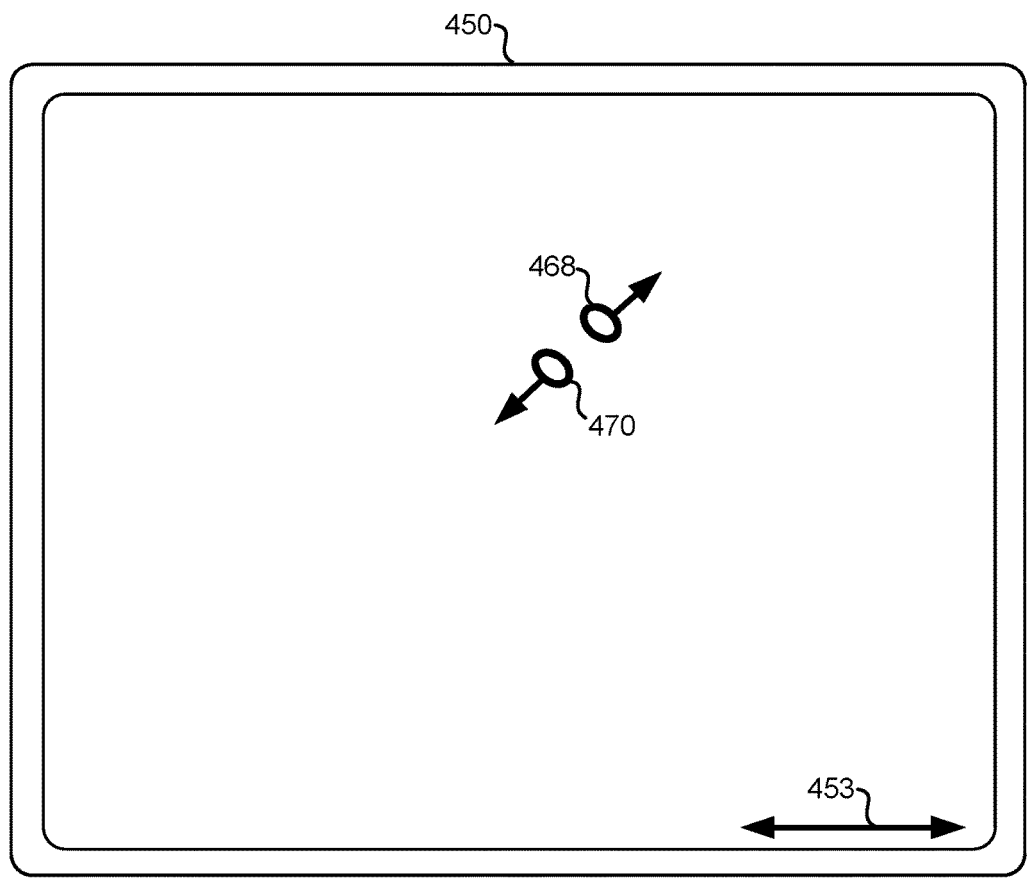
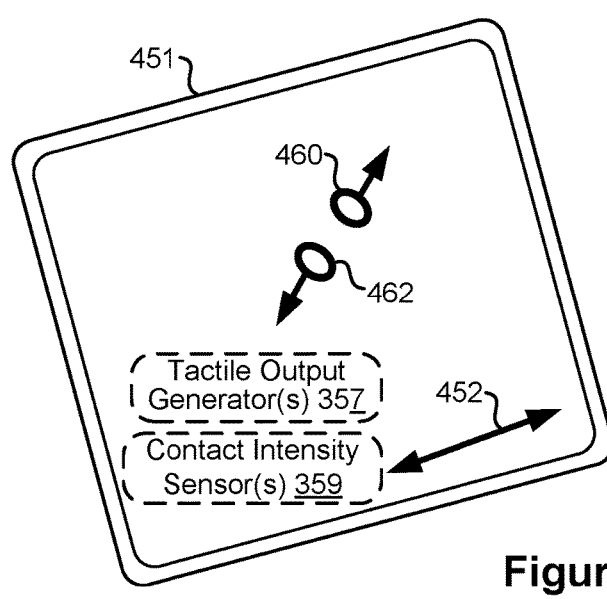
Figure 4B

500

Displaying a collection view window on a user interface of a device configuration application for configuring a plurality of devices
502

Concurrently displaying representations of a plurality of devices and configuration states of the plurality of devices within the collection view window, wherein:
504

Representation of a first device comprises a screen image that is selected so as to represent a configuration state of the first device
506

Representation of a second device comprises a screen image that is selected so as to represent a configuration state of the second device
508

While the first device is in a first configuration state and the second device is in a second configuration state that is different from the first configuration state, the screen image in the first representation is different from the screen image in the second representation
510

While displaying the user interface of the device configuration application, detecting a change in the configuration state of the first device from the first configuration state to a different configuration state
512

In response to detecting the change in the configuration state of the first device: updating the representation of the first device to include a screen image that represents the different configuration state instead of the screen image that represents the first configuration state
514

While the electronic device is connected to a plurality of other devices that include a first device and a second device, receiving a request to change an appearance of lock screens of the plurality of devices, wherein the request specifies a format for displaying information on the lock screens of the plurality of devices
1502

In response to receiving the request:

Updating the lock screen of the first device to contain a lock screen image that includes first information in the format specified in the request
1504

Updating the lock screen of the second device to contain a lock screen image that includes second information in the format specified in the request
1506

Wherein the second information is different from the first information
1508

Figure 15

MULTIPLE DEVICE CONFIGURATION APPLICATION

CROSS REFERENCE TO RELATED APPLICATIONS

This application claims the benefit of U.S. Provisional Application No. 62/172,219, filed Jun. 7, 2015, which is incorporated by reference in its entirety.

BACKGROUND

Field of Technology

The embodiments herein generally relate to user interfaces for the configuration of multiple electronic devices.

Background

Electronic devices may permit users to update software, download or remove applications, synchronize application data, or otherwise configure a device using a series of user interfaces (UIs) and option icons on the device or from an application on a computer to which the device is connected.

SUMMARY

Unfortunately, when configuring multiple devices the same steps may need to be completed on each device to configure a number of devices with the same software, applications, data, etc., which can become a repetitive process. Even when software exists to update multiple devices at once, existing solutions typically do not allow determining the status of each device at a glance and therefore quickly identify the devices in need of an update or configuration.

An electronic device displays a user interface (UI) of a device configuration application. The device configuration application UI displays representations of multiple connected devices concurrently. Each representation displayed in the device configuration application additionally represents the configuration state of the connected device it represents. For example, if two connected devices of the same type but having different configuration states are represented, the representations of the two devices differs from each other according to the configuration states of the devices. Upon detecting a change in the configuration state of a represented device, the electronic device updates the representation of the device to include a screen image representing the new configuration state. In some embodiments, the representations of the devices include screen images that represent screenshots from the device and reflect the actual state of the device (e.g. the wallpaper and arrangement of icons on the Home screen) that, optionally, change as the state of the device changes (e.g., as icons on the home screen are rearranged, or as the device transitions from a restore state to an unlocked state). In some embodiments, the representations of the device include generic screenshots that are representative of the state of the device (e.g., a generic home screen from a newly restored device).

In some embodiments, the electronic device displays a user interface of a device configuration application and receives a search request for information about one or more configuration states of the one or more devices connected to the electronic device. Upon detecting the search request for information about the one or more configuration states of the connected electronic devices, the electronic device searches the configuration states of the plurality of connected devices based on the search request. In response to obtaining a match between the search request and one or more of the connected devices, the electronic device displays a representation for each device having the one or more configuration states for which the match was obtained. In some embodiments, the search is based on tags that are optionally stored on the connected devices.

In some embodiments, the electronic device displays a collection view window in a user interface of a device configuration application. The collection view window includes a plurality of devices, which include a first device and a second device, each device associated with a first device type and a second device type, respectively. The electronic device also displays a plurality of device configuration templates in the collection view window. The device configuration templates include a first device configuration template associated with the first device type and a second device configuration template associated with the second device type. The electronic device receives a selection of a first subset of connected devices that are associated with the first device type. The electronic device also receives a selection of the device configuration template. Upon receiving a change request, the electronic device changes the configuration state of each device included in the first subset of connected devices to the configuration state of the first device configuration template.

In some embodiments, the electronic device is connected to multiple devices and displays a user interface of a device configuration application. The electronic device receives a request to change the appearance of the lock screens of the connected devices that includes a first device and a second device. The request to change the appearance of the lock screen specifies a format for displaying information on the lock screens of the connected devices. Upon receiving the request to change the lock screens of the connected devices, the electronic device updates the lock screen of the first device to contain a lock screen image that includes first information in the format specified in the request. Upon receiving the request, the electronic device also updates the lock screen of the second device to contain a lock screen image that includes second information in the format specified in the request, while the second information is different from the first information. Thus, the information applied to the lock screen of each device is different according to each of the devices to which it is applied. For example, the information includes the serial number of each device and so the updated lock screens display different serial numbers for each device.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 5 is a flowchart illustrating a method 500 using a collection view window on a user interface of an electronic device to facilitate configuring a plurality of devices, according to some embodiments.

FIG. 15 is a flowchart illustrating a method 1500 for changing the appearance of the user interface of a plurality of device that facilitates future configuration of the devices, according to some embodiments.

Figure 1A:
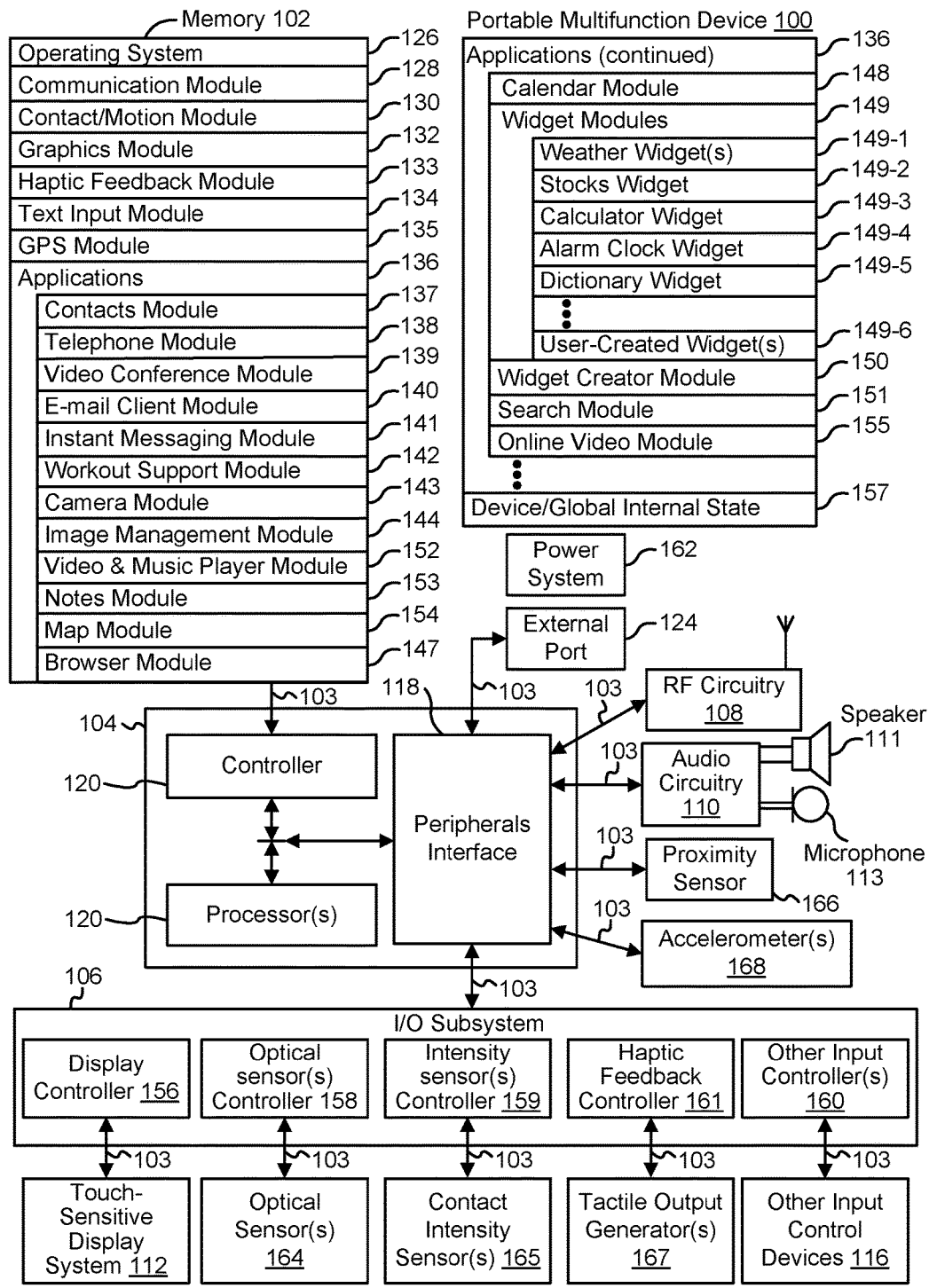
FIG. 1A is a block diagram illustrating a portable multifunction device with a touch-sensitive display in accordance with some embodiments.

The figures depict, and the detail description describes, various non-limiting embodiments for purposes of illustration only. One skilled in the art will readily recognize from the following discussion that alternative embodiments of the structures and methods illustrated herein optionally are employed without departing from the principles described herein.

DETAILED DESCRIPTION

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments optionally are practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described.

It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volumecontrol of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In some embodiments, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in some embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In some embodiments, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
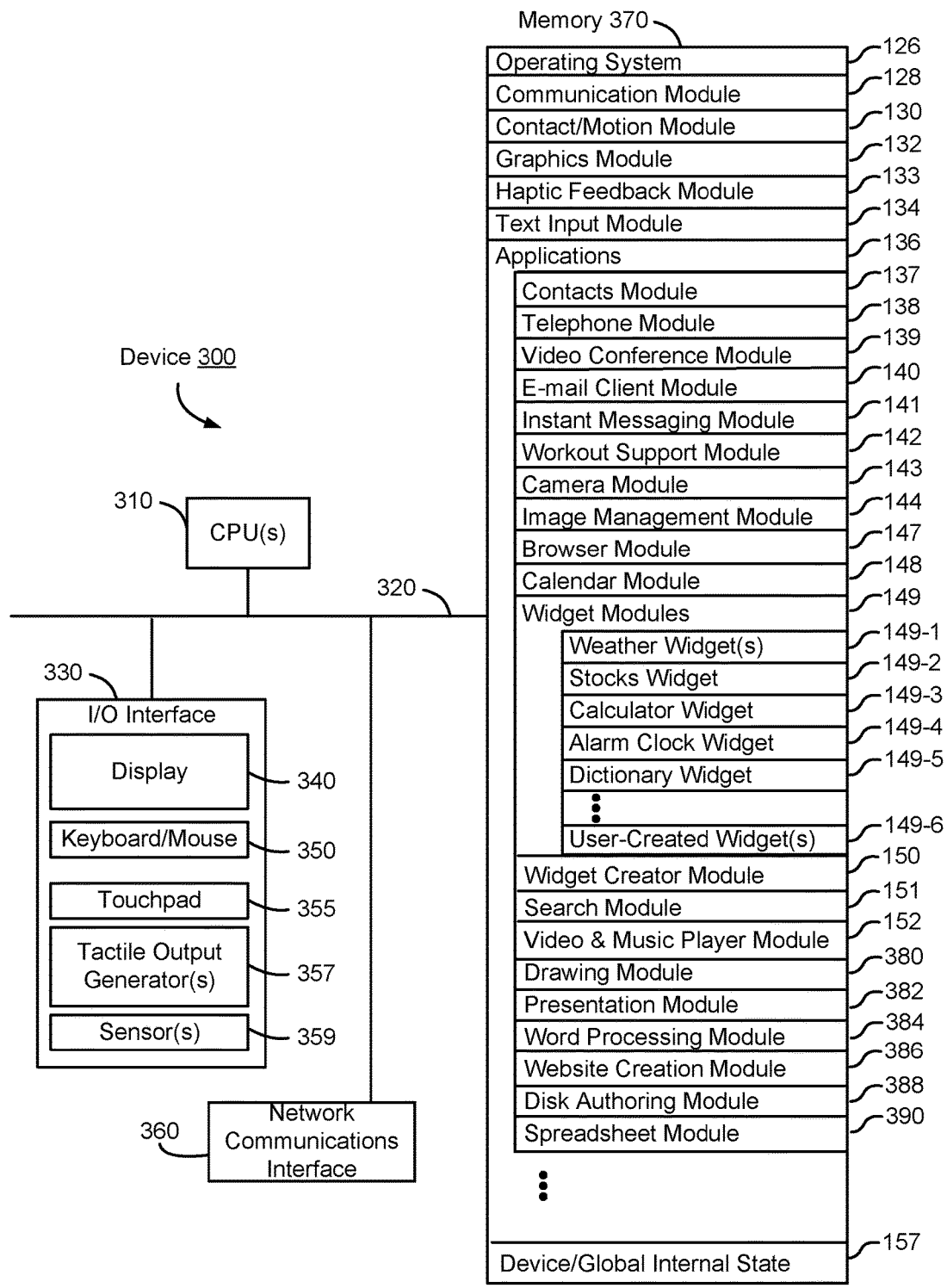
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124.

External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail or email client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), email address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in some embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In some embodiments, a "menu button" is implemented using a touchpad. In some embodiments, the menu button is a physical push button or other physical input control device instead of a touchpad.

Figure 1B:
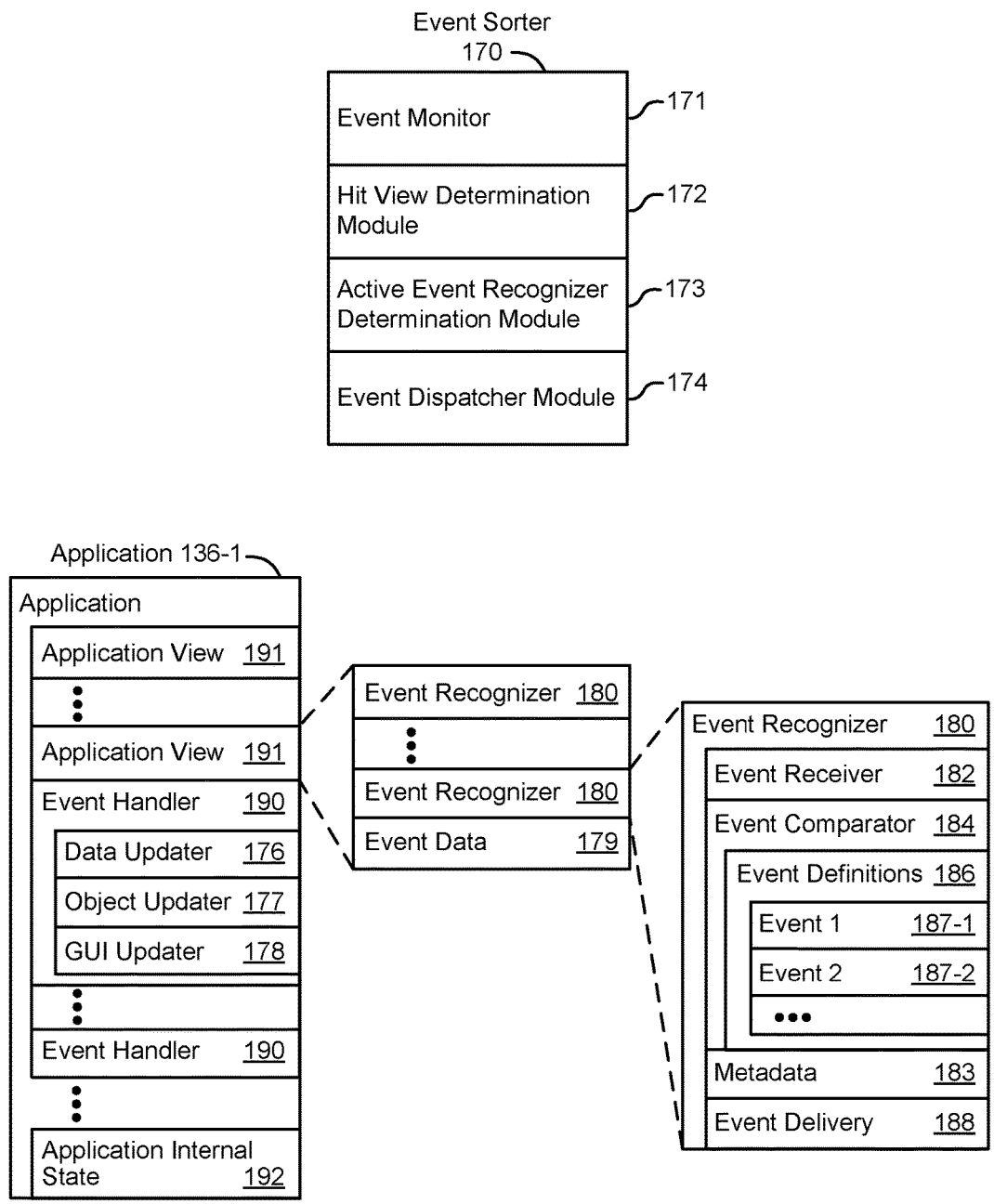
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In some embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In some embodiments, active event recognizer determination module 173 determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In some embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In some embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
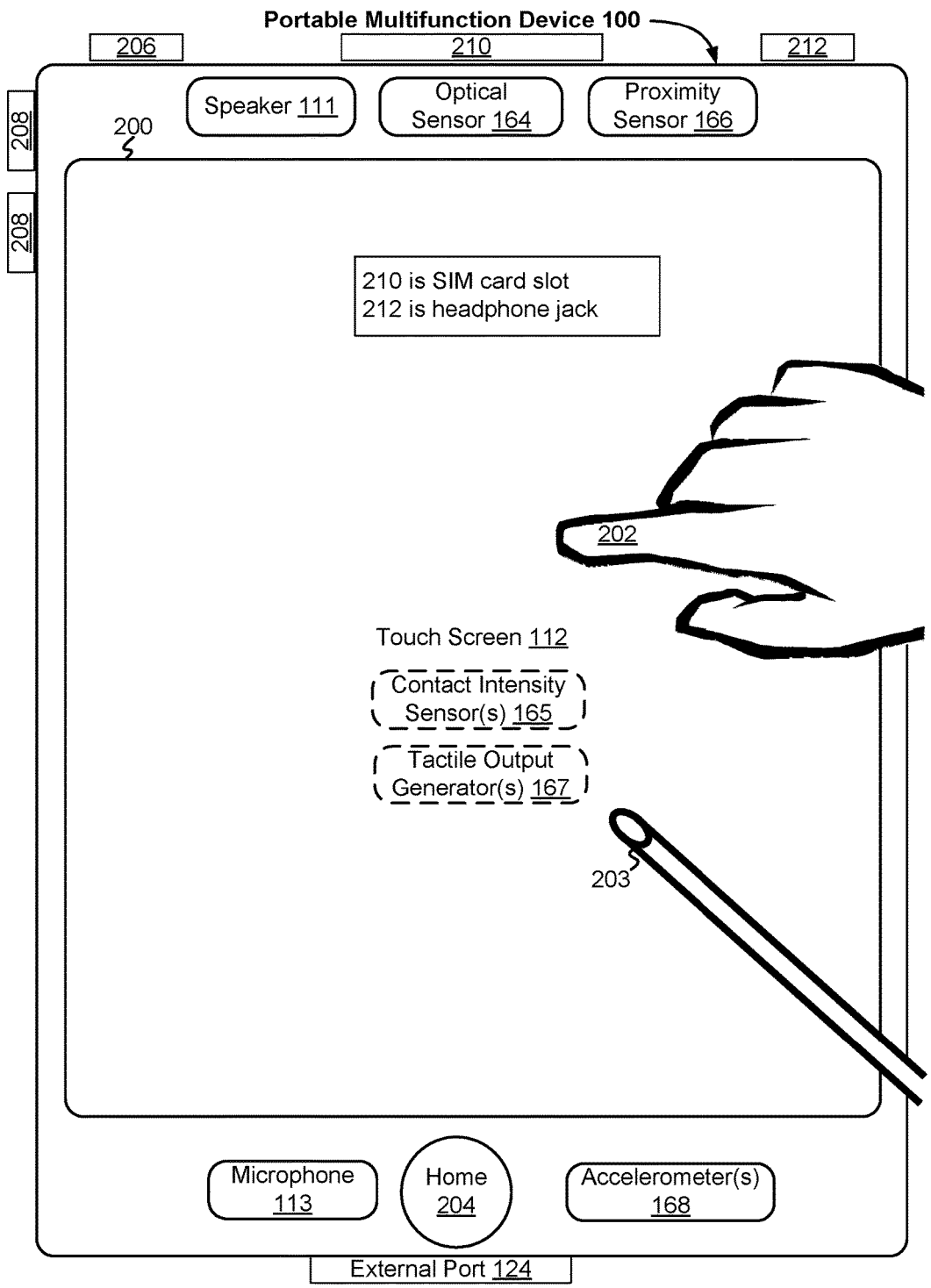
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In some embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. In some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and, optionally, a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is optionally a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, web site creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in some embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
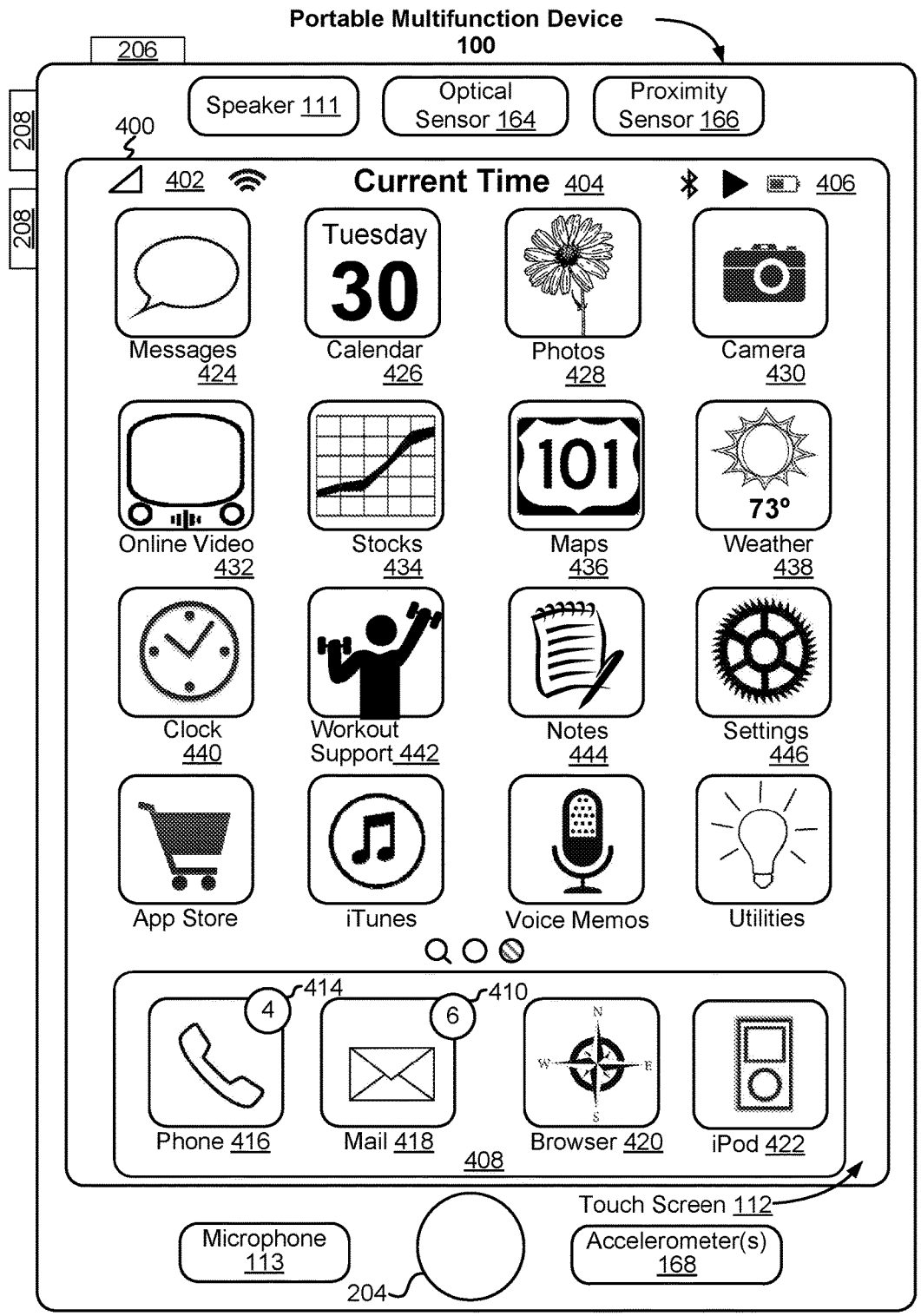
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for email client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 149-4, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357 for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with some embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

Attention is now directed towards embodiments of user interfaces ("UI") and associated processes that optionally are implemented on an electronic device with a display and a touch-sensitive surface, such as device 300 or portable multifunction device 100.

As mentioned previously, the device 100 includes multiple applications 136 configured to execute on the device 100. One of the multiple applications 136 is the email client module 140 and a user can interact with the application on the computing device 100. As will be further described below, the email client module 140 has various user interfaces to enhance the user experience with the computing device 100 when using the application.

Multiple Device Configuration Application

1. Collection View

FIG. 5 is a flowchart illustrating a method 500 using a collection view window on a user interface (UI) of a device configuration application to facilitate configuring a plurality of devices, according to some embodiments. The method allows the user to view the current configuration state of each device and select devices based on their configuration state.

A configuration state of a device includes, for example, the type of the device and other physical properties of the device. Other physical properties of the device include, but are not limited to, its form factor, the device model, its color, its remaining storage capacity, its overall storage size, its battery status, and the like. In some embodiments, the configuration state includes the software state of the device. Thus, unless otherwise specified, a configuration state also refers to a software state and vice versa. The software state of the device includes, but is not limited to, the applications installed on the device, the state, type, and version of the device's operating system, the current state of the device display, the lock screen of the device, and the home screen of the device. In some embodiments, the software state, and thus the configuration state, of a device includes the wallpaper of its lock screen or the wallpaper of the lock screen and the arrangement of icons on the home screen.

In some embodiments, configuration states of devices and information related to the configuration states are retrieved from the devices by a management server that supervises the devices. Examples of management servers are disclosed in U.S. Pat. No. 9,027,112, issued May 5, 2015, which is incorporated herein by reference in its entirety.

In some embodiment, the configuration state includes the activation mode of the device and the device serial number. The activation mode indicates whether the device is in a locked, an unlocked, a supervised, an unsupervised, a disabled, a restored, an unrestored, a recovered, a backed-up, an uninitialized mode, or the like. In some embodiments, the configuration state of a device is shown in the collection view window. In some embodiments, the displayed configuration state in the collection view window indicates that the device is missing a configuration or that the device belongs to an organization of devices.

An example organization of devices include, but is not limited to, devices assigned to a class room at an educational institution, to an education institution in general, to a project group or department at a company, or all devices of a company. In some embodiments, the organization of devices is based on geography or use (e.g., all devices assigned to a company campus or city locale). Another organization of devices includes all devices that are used for particular tasks, e.g., word-processing, transacting sales by using the device as a credit card reader and/or bar code scanner, or displaying advertisements.

In the collection view window, a screen image represents each device, which shows the configuration state of the device. For example, if a device is in locked mode, the screen image corresponding to this device shows a lock screen in the collection view. Displaying representations of the configuration state of each device allows the user of the device configuration application to visibly identify and select a set of screen images and their corresponding devices. Once selected, the device configuration application optionally configures the selected devices. Configuring a device includes, for example, uploading or updating applications, profiles, the computing operating system, consoles, documents, data, security settings, or other properties of the configuration state. An advantage of the method includes collectively configuring a set of devices based on their current configuration states.

The method 500 is performed at an electronic device with a display and an input device, such as the portable multifunction device 100 shown in FIG. 1A or device 300 shown in FIG. 3, as may be controlled by specially programmed code (computer programming instructions) contained in the graphics module 132, wherein such specially programmed code is not natively present in the device 300. Other embodiments of the electronic device include general-purpose computers, e.g., a desktop computer, a laptop computer, computing servers, or any similar computing devices. Some embodiments of the method 500 may include fewer, additional, or different steps than those shown in FIG. 5, and the steps may be performed in different orders. The steps of the method 500 are described with respect to example user interfaces illustrated in FIGS. 6A, 6B, 7, and 8.

Figure 6A:
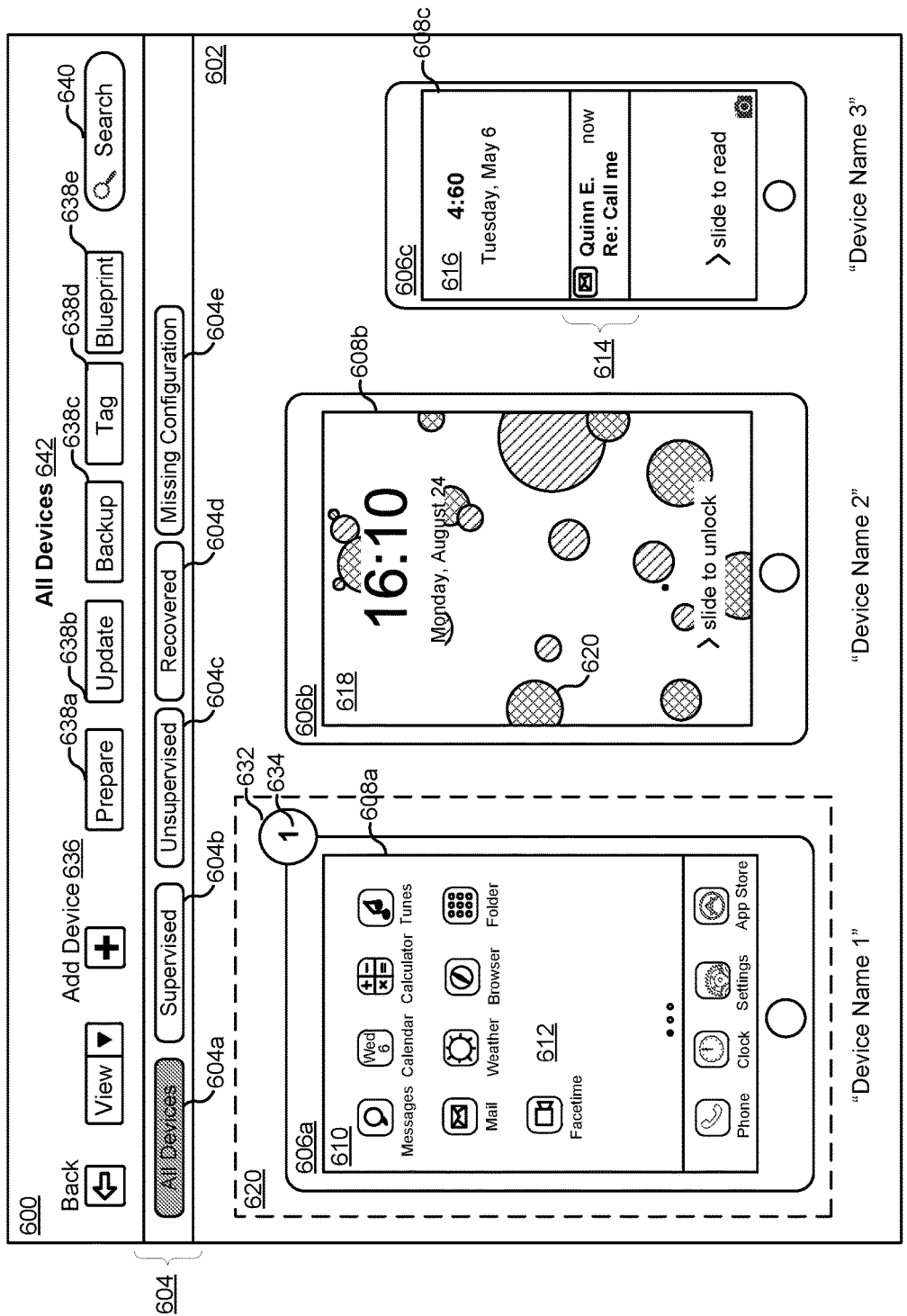
FIGS. 6A and 6B illustrate an exemplary collection view window of the user interface of a device configuration application that includes multiple device representations displaying different screen images that correspond to different configuration states of the devices, according to some embodiments.

Referring to FIGS. 5 and 6A, the electronic device 100 displays 502 a collection view window 602 on a user interface 600 of a device configuration application for configuring a plurality of devices that are connected (either wirelessly or via wired connections) to the electronic device 100. As illustrated in FIG. 6A, in some embodiments, the collection view window 602 includes options 604 for filtering the display of devices in the collection view window 602. Filtering options include "All Devices" 604a, "Supervised Devices" 604b, "Unsupervised Devices" 604c, "Recovered" devices 604d, and "Missing Configuration" devices 604e. In some embodiments, the filtering option 604 is displayed as a selectable user interface element. In some embodiments, the device configuration application UI 600 includes a UI title 642 based on the specified filtering option 604. In some embodiment, the selectable user interface element is selected by selection gesture, which, for example, is a contact on a touch-sensitive surface at a location on the display corresponding to the selectable user interface element. In some embodiments, the selection gesture is clicking on the selectable user interface element with a mouse or cursor at the location on the display corresponding to the selectable user interface element. In some embodiments, the selected filtering option 604 is visibly distinguished from the unselected options. For example, as illustrated in FIG. 6A, the selected filtering option "All Devices" 604a has a darker background color than the unselected ones 604b-604e. In some embodiments, filtering of devices that are displayed in the collection view window 602 is achieved by searching the devices through the search box 640 in the device configuration application UI 600.

To facilitate device configuration, the method 500 further includes that the electronic device 100 concurrently displays 504 representations 606 of a plurality of devices and their configuration states within the collection view window 602. The displayed representations 606 include a representation 606a of a first device. The representation 606a of the first device includes a screen image 608a that is selected 506 so as to represent a configuration state of the first device (e.g., a screen image selected to represent the appearance of the screen of the device based on the activation state of the device). In addition, the displayed representations 606 also include a representation 606c of a second device, which is a screen image 608c that is selected 508 so as to represent a configuration state of the second device. In some embodiments, as described in detail above, the representations 606a, 606b, including the screen images 608a, 608c, of the first or second device are based on the physical properties of the first or second device, respectively. In some embodiments, the representations 606 include the names of the devices. In some embodiments, a selected representation is visibly distinguished from other representations, e.g., by highlighting the selected representation, as illustrated by the dashed rectangle surrounding representation 606a in FIG. 6A or representation 606d in FIG. 6B.

Figure 6B:
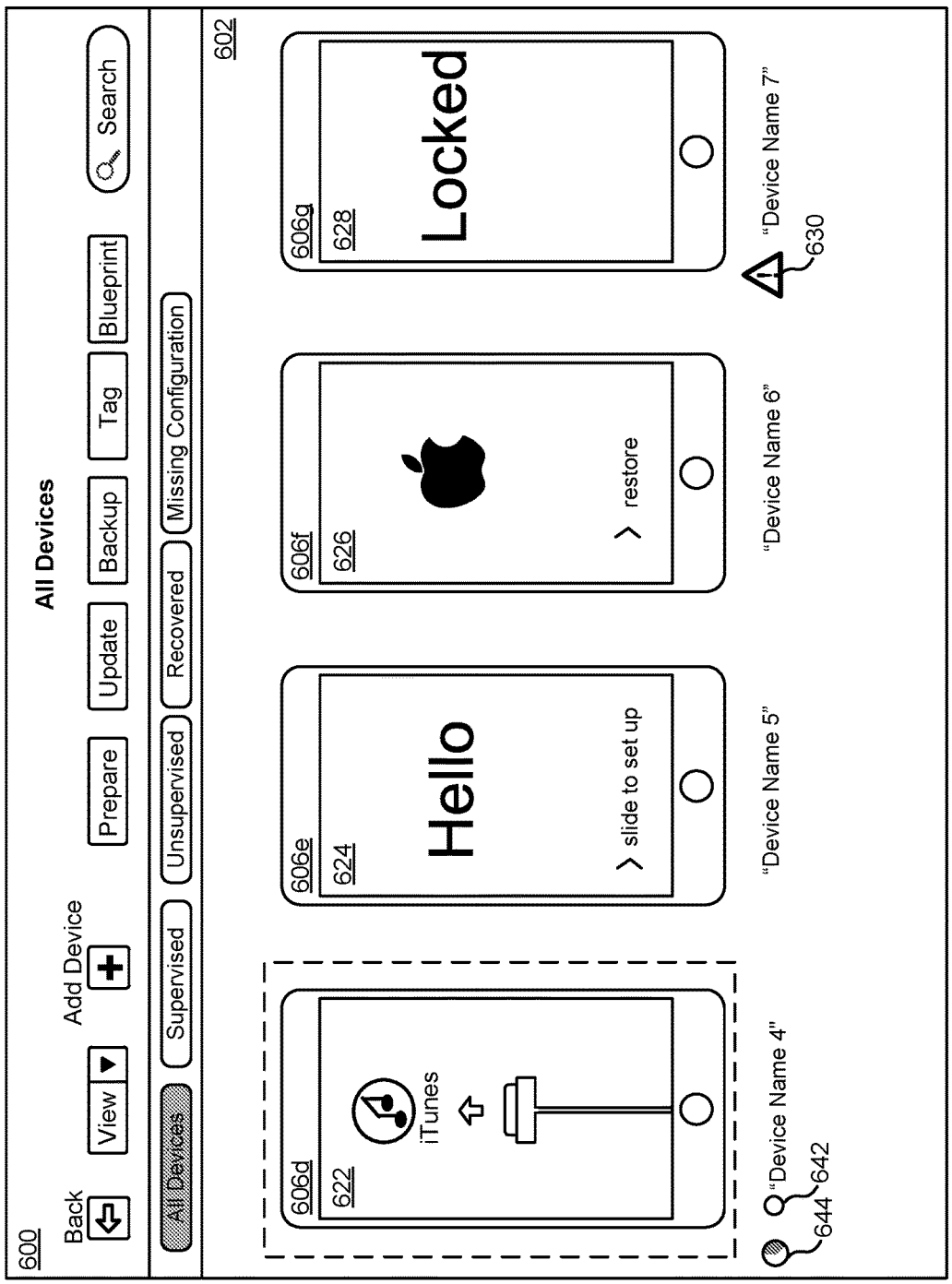

Examples of physical device properties that affect the representation of a device include, but are not limited to, the form factor, model, type, or color of the device. In some embodiments, the first device is in a first configuration state, e.g., a tablet device displaying a Home screen 610 and an arrangement of icons 612, and the second device is in a second configuration state that is different from the first configuration state, e.g., a phone device displaying a notification 614 on a lock screen 616. FIGS. 6A and 6B illustrates additional representations 606b, 606d-606g of configuration states, which includes a tablet device displaying a lock screen 618 and wallpaper 620, and various phone devices 606d-606g. In some embodiments, the screen image 608d-608g representing a configuration state of the device comprises a pre-defined default image.

As illustrated in FIG. 6B, default images include, for example, a Connect to iTunes screen 622 for a device in recovery mode, a Hello screen 624 for a device in the initial setup mode, a restore screen 626 for a device in restore mode, or a screen 628 with the device in locked mode. In some embodiments, the representation of a locked device includes a lock indicator 630, as shown in FIG. 6B. In some embodiments, the representations 606 include a tag indicator 642 displayed through a color circle for a tag that is associated with certain devices. In some embodiments, a representation 606 includes an update status indicator 644.

If a device is in locked mode, the device configuration application is unable to configure the locked mode device. In some embodiments, to change the device to an unlock mode, upon connecting the locked mode device to the electronic device running the device configuration application, the locked mode device displays a popup window providing an option to select whether to trust or not to trust the electronic device. Upon selecting to trust the electronic device, the locked mode device changes to an unlocked mode with respect to the device configuration application, and the device representation is also changed, by the electronic device 100 displaying the collection view 602, to an unlocked mode in the collection view window, accordingly. In some embodiments, when the device is trusted and supervised by the device configuration application, the lock indicator 630 disappears from the representation of the unlocked device.

The concurrent display 504 of representations 606 and configuration states within the collection view window 602 further includes that while the configuration states of the first and second device are different, the screen image 608a in the first representation 606a is also different 510 from the screen image 608c in the second representation 606c. For example, as illustrated in FIG. 6A, the representation 606a of the tablet device with the Home screen 610 is different from the representation 606b of the tablet device with the lock screen 618.

Furthermore, method 500 includes that while displaying 504 the user interface 600 of the device configuration application, the electronic device detects 512 a change in the configuration state of the first device from the first configuration state to a different configuration state. For example, the representation 606b corresponding to configuration state of tablet device represented by the lock screen 618 changes, when tablet device is unlocked. In this case, the electronic device 100 running the device configuration application detects the change from locked to unlocked state of the tablet device through the connection of the tablet device with the electronic device. In response to detecting 512 the change in the configuration state of the first device, the electronic device updates 514 the representation of the first device to include a screen image that represents the different configuration state instead of the screen image that represents the first configuration state. In the example of representation 606*b* displaying a table device with a screen image of the lock screen 618, the representation changes from the lock screen 618 to a Home screen of the tablet device.

Figure 7:
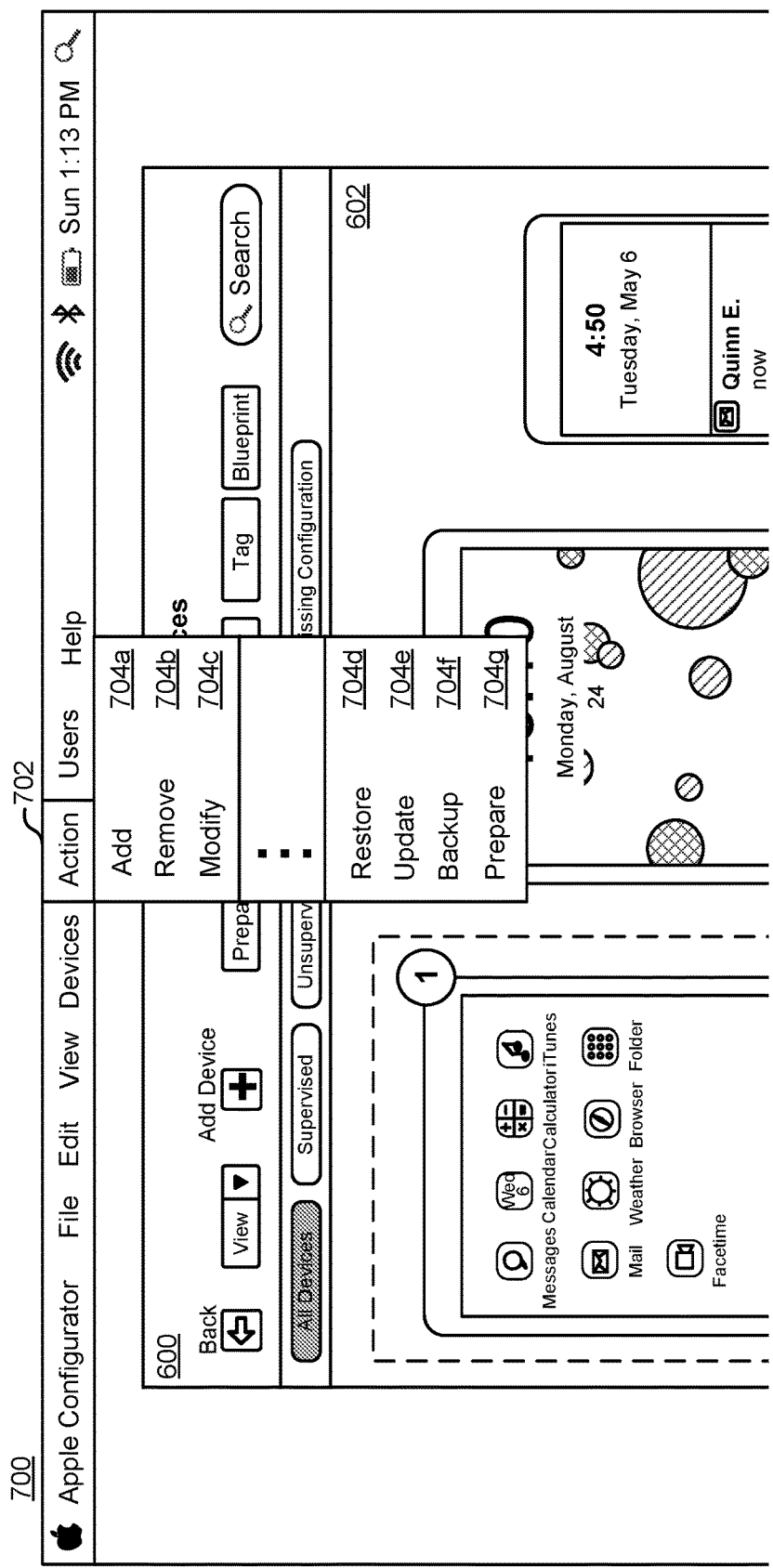
FIG. 7 illustrates displaying an action bar menu of actions for configuring devices with representations in the collection window of the user interface of a device configuration application, according to some embodiments.

In some embodiments, a number of available updates for one or more of the devices is displayed for one or more devices in the collection view window. In some embodiments, as illustrated FIG. 6A, a badge 632 is associated with the representation 606*a* of a device to indicate that an update is available for the device. In some embodiments, the badge displays a number 634 that equals the number of available updates. Upon selecting a number of the available updates for one or more devices, the device configuration application updates the one or more devices with the selected number of available updates. In some embodiments, an update includes an update to applications configured on the one or more devices, an update to the computer operating system on the one or more devices, or any combination thereof. In some embodiments, selecting a number of available updates includes the options of selecting to update all applications installed on the device, selecting to update only some applications, or selecting to update the computer operating system of the device. In some embodiments, these options are accessible as options of an "Update action" 704*e* through the action menu window 702 of the menu bar 700 of the device configuration application UI 600, as illustrated in FIG. 7.

In some embodiments, besides the "Update" action, the action menu window also includes an "Add" action 704*a*, a "Remove" action 704*b*, a "Modify" action 704*c*, a "Restore" action 704*d*, a "Backup" action 704*f*, and a "Prepare" action 704*g*. The "Add" action allows adding applications, documents, profiles and other configuration parameters to a configuration state of one or more selected devices. The "Remove" action allows removing applications, documents, profiles and other configuration parameters from a configuration state of one or more selected devices. The "Modify" action allows modifying a set of pre-defined configuration parameters and their corresponding settings, e.g. the email server address for an email application. The "Restore" action allows for setting the configuration state of one or more selected device to restore their computing operating system to the factory state of the operating system. The "Prepare" action allows for first time configuration of non-configured devices.

In some embodiments, while displaying device representations in the collection view window, the electronic device 100 receives a request to add one or more additional representations 606 of device to the devices in the collection view window 602. A request is received, for example, when additional devices are connected to the electronic device 100. In some embodiments, the additional devices are manually added to the collection view window 602. The user interface 600 of the device configuration application, as illustrated in FIGS. 6A and 6B, includes an "Add Device" user interface element 636 that upon selection allows adding representations 606 of device to the collection view window 602. Upon receiving the request to add more representation, the electronic device 100 through the device configuration application reduces the size of one or more representations 606 among the representations in the collection view window to accommodate the display of the additional representations 606. The electronic device 100 displays the additional representations in addition to the original representations 606 of the collection view window 602. In some embodiments, the screen images 608 of the devices are scaled in the collection view window 602 in such a manner as to reduce the need for scrolling within the collection view window. In some embodiments, upon connecting additional devices to the electronic device executing the device configuration application, the screen images of the original representations 606 in the collection view window 602 are dynamically scaled and/or rearranged to accommodate displaying the representation and its corresponding screen image of the newly connected device.

In some embodiments, upon detecting 512 an update request, only devices that are selected within the collection view window 602 are updated according to the update request without updating any unselected devices. An update request includes, for example, updating one or more applications, documents and/or profiles of the selected devices. In some embodiments, the detection 512 of an update request is based on the selection of an "Update" user interface element 638*b* of the device configuration application UI 600, as illustrated in FIGS. 6A and 6B. In some embodiments, the update request results from selecting an "Update" action 704*e* through the action menu window 702 of the device configuration application UI 600, as illustrated in FIG. 7.

In some embodiments, upon detecting a backup request, only devices that are selected within the collection view window 602 have their configuration information backed up in accordance with the backup request without backing up the unselected devices. The backup of the configuration information allows for later retrieval and restoring the device to the configuration state just prior to the backup. In some embodiments, the configuration information is backed to a pre-defined location, e.g., a database, which can be accessed by the electronic device 100 running the device configuration application. In some embodiments, the configuration information includes information about applications, documents, or profiles that are configured and/or installed on the backed up devices. In some embodiments, the detection of a backup request is based on the selection of a "Backup" user interface element 638*c* of the device configuration application UI 600, as illustrated in FIGS. 6A and 6B. In some embodiments, the backup request results from selecting a "Backup" action 704*f* through the action menu window 702 of the device configuration application UI 600, as illustrated in FIG. 7. In some embodiments, the device configuration application UI 600 includes a "Prepare" UI element 638*a*, an "Update" UI element 638*b*, a "Tag" UI element 638*d*, and a "Blueprint" UI element 638*d*.

Figure 8:
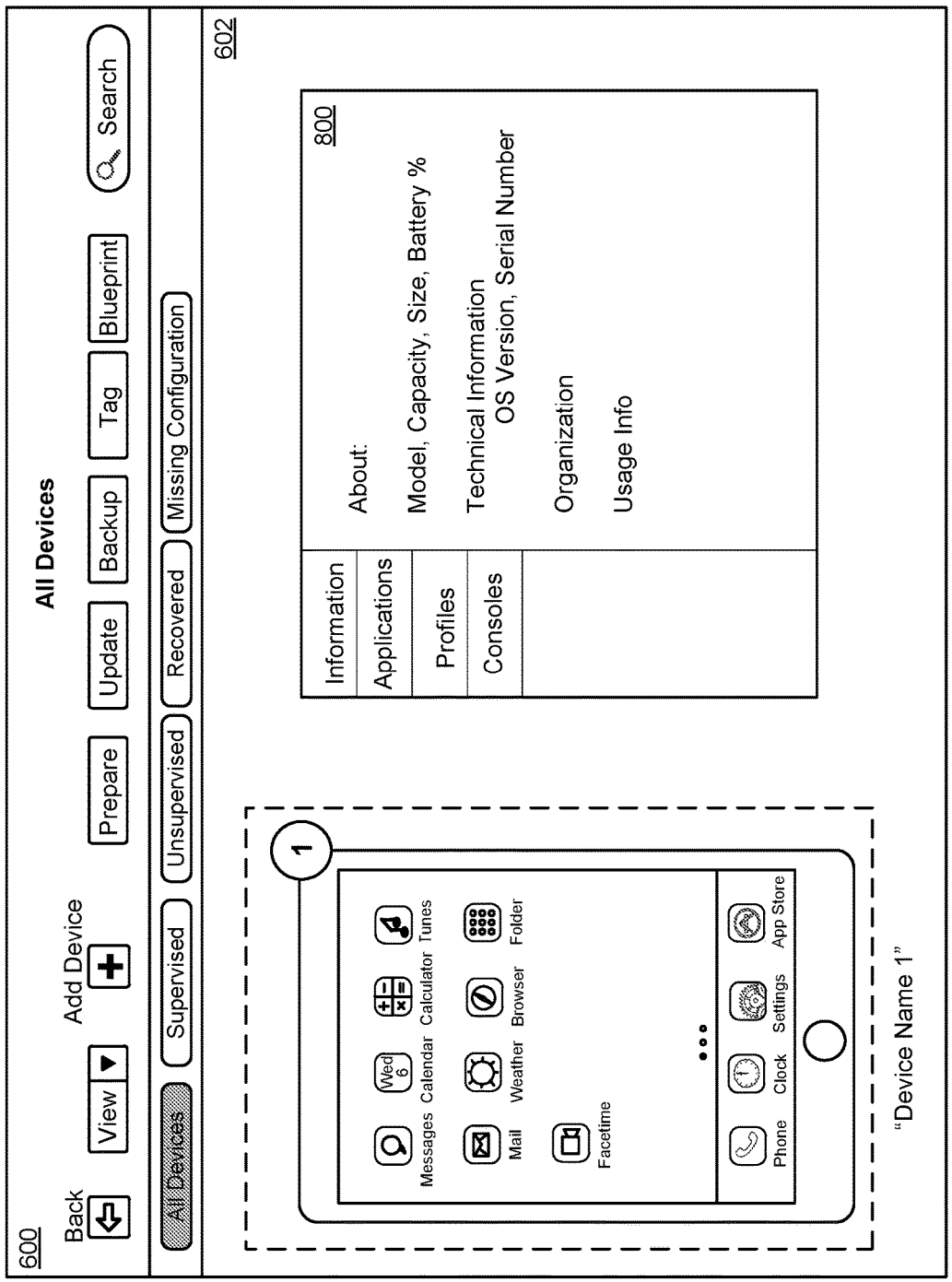
FIG. 8 illustrates displaying information about a selected representation of a device in the collection window of the user interface of a device configuration application, according to some embodiments.

In some embodiments, as illustrated in FIG. 8, upon detecting a configuration information request, the electronic device displays configuration information of only the selected the devices on the user interface 600 of the device configuration application in accordance with the configuration information request without displaying configuration information of unselected devices. In some embodiments, the configuration information request includes a selection gesture with one or more representations displayed within the collection view window. In some embodiments, a selection gesture includes a contact on a touch-sensitive surface at a location on the display corresponding to the selectable representation of a device. In some embodiments, the selection gesture is clicking on the selectable representation with a mouse or cursor at the location on the display corresponding to the selectable representation. The configuration information 800 includes general information about the device, e.g., device name, the model of the device, the device's remaining and used capacity, device size, battery status, and technical information. The technical information includes, for example, the version of computer operating system and serial number of the device. Additional configuration information includes the organization that the device belongs to and usage information about the device. In some embodiments, upon detecting a configuration information request, the electronic device also displays an option to further inquiry into the displayed configuration information. For example, an option is includes displaying all applications that are installed on the device instead of the general configuration information. Other options include displaying all device profiles or device consoles.

In some embodiments, the representations of the device include screenshots that are retrieved from the device and reflect the actual state of the device. For example, the screen image of the representation of a device shows the wallpaper and arrangement of icons on the device's Home screen. In some embodiments, the representation of the device in the collection view window changes as the configuration state of the device changes. For example, if the icons on the Home Screen are rearranged, the icon arrangement of the screen image included in the representation of the device also changes. In some embodiments, the representations of the devices include generic screenshots that are representative of the state of the device, e.g., a screenshot of a generic Home screen for a newly restored device. Examples of other generic screen images included in device representation are shown in FIG. 6B.

2. Configuration Search

Figure 9:
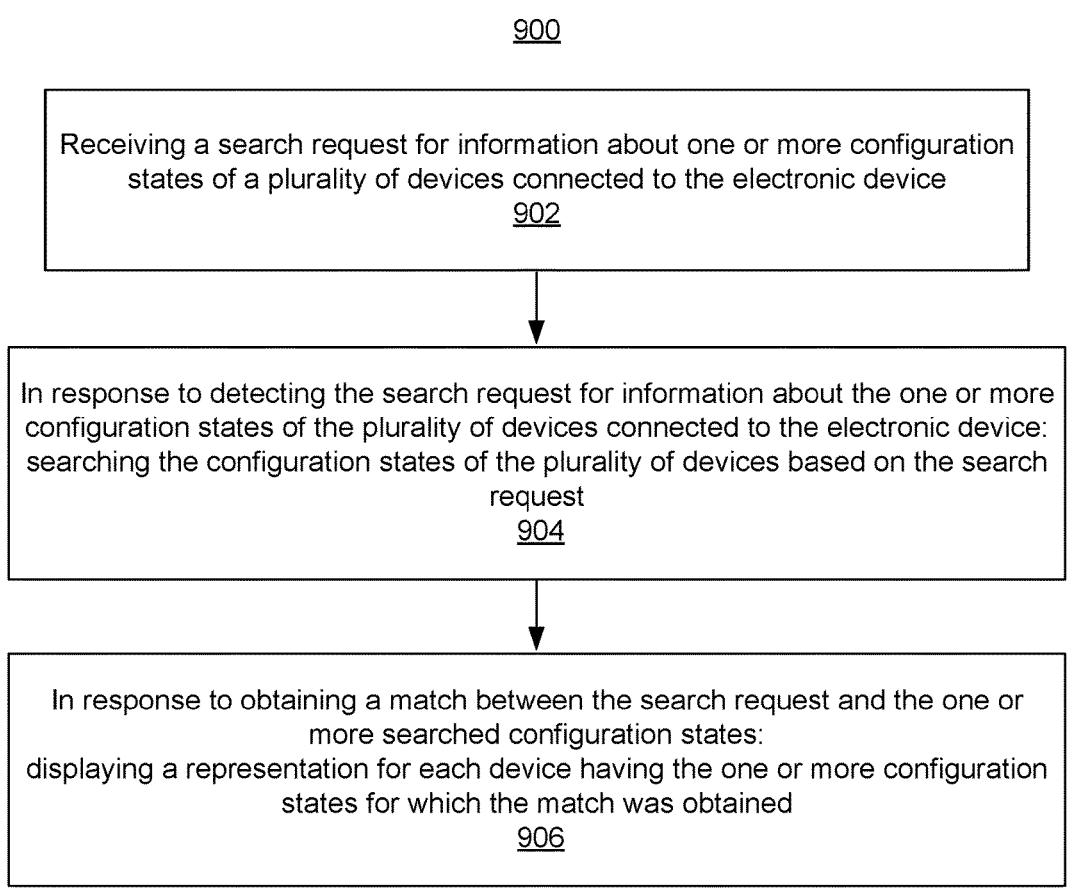
FIG. 9 is a flowchart illustrating a method 900 for searching devices based on the configuration states of the devices through the user interface of a device configuration application, according to some embodiments.

FIG. 9 is a flowchart illustrating a method 900 for searching devices based on the configuration states of the devices through the user interface 600 of a device configuration application, according to some embodiments. The method allows the user to search devices that are connected to the electronic device running the device configuration application. In some embodiments, a searchable configuration state includes a recovery state, a booted state, a locked state, an updates available state, an initial configuration state, a backup state, a timed and untimed lock-out state, or any combination thereof. In some embodiments, searching based on a configuration state includes searching for a device name, a device type, a profile installed on a device, an application installed on a device, a name of a document stored on a device, an identifier of data stored on the device, or any combination thereof.

In some embodiments, the search is based on tags that are associated with one or more devices of the devices that are searched. In some embodiments, as illustrated in FIG. 6B, the representation 606 of the device that is tagged includes a tag indicator 640 in the collection view window 602 of the device configuration application UI 600. In some embodiments, the tag indicator 640 includes a colored circle displayed in front of the device name 642 included in the device representation 606. Different search tags are indicated by different colors, which can be specified by the user.

The method 900 is performed at an electronic device with a display and an input device, such as the portable multifunction device 100 shown in FIG. 1A or device 300 shown in FIG. 3, as may be controlled by specially programmed code (computer programming instructions) contained in the graphics module 132, wherein such specially programmed code is not natively present in the device 300. Other embodiments of the electronic device include general-purpose computers, e.g., a desktop computer, a laptop computer, computing servers, or any similar computing devices. Some embodiments of the method 900 may include fewer, additional, or different steps than those shown in FIG. 9, and the steps may be performed in different orders. The steps of the method 900 are described with respect to example user interfaces illustrated in FIGS. 10, and 11.

Referring to FIG. 9, the electronic device 100 receives 902 a search request for information about one or more configuration states of a plurality of devices connected to the electronic device. In some embodiments, the search request results from a user typing a search text string into the search box 642 of the device configuration application UI 600. In some embodiments, while the user types the search text string, the device configuration application provides auto-completion options of the typed text string based on the connected devices and their configuration states. For example, if application "DesignTool" is installed on the connected device "DesignDevice", upon typing "Des" the auto-completion option of "DesignTool" in addition to "DesignDevice" is presented in the search box 642.

Upon receiving 902 the search request for information about the one or more configuration states of the connected devices, the electronic device searches 904 the configuration states of the devices based on the search request. If a match between the search request and the one or more searched configuration states is obtained, the electronic device 100 displays 906 a representation 606 of device. The representation 606 shows the device and the device's configuration state for which the match was obtained. In some embodiments, a search request includes a search for applications, device profiles, organization information of devices, device updates and the like. In some embodiment, a search request is context sensitive. In some embodiments, the search request is based on one or more of applications installed on the devices, one or more profiles installed on the devices, one or more names of documents stored on the devices, one or more identifiers of device data stored on the devices, or any combination thereof.

Figure 10:
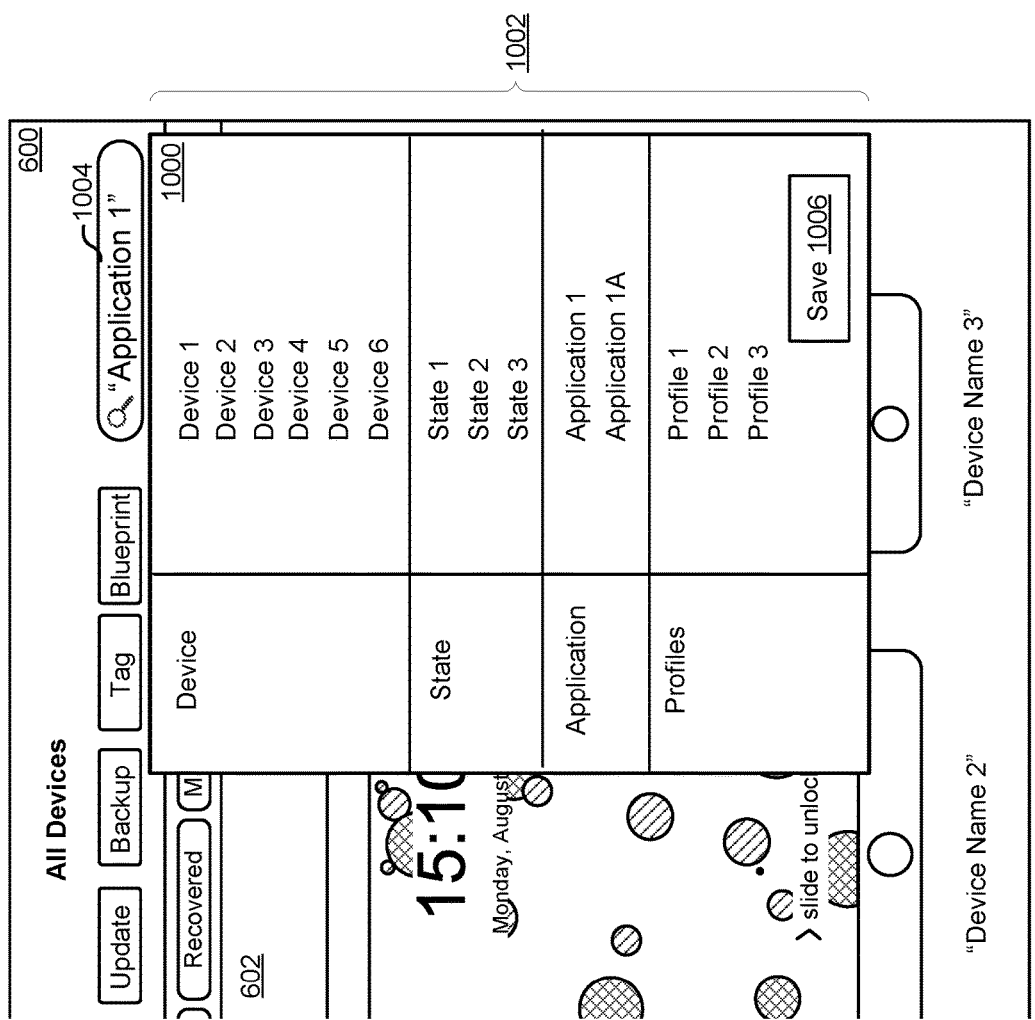
FIG. 10 illustrates displaying a result window for searching devices in the collection window of the user interface of a device configuration application, according to some embodiments.

In some embodiments, as illustrated in FIG. 10, the results of the search are displayed on the user interface 600 of the device configuration application in form of a result window 1000. In some embodiments, the result window 1000 lists matches according to categories 1002. These categories include devices 1002a, states 1002b, applications 1002c, and profiles 1002d that are matches to the search request. For example, a search request 1004 for "Application 1" results in matches of "Device 1" through "Device 6" with each device having "Application 1" installed. In addition, "State 1" through "State 2" and "Profile 1" through "Profile 3" are associated with "Application 1" and therefore represent a match. The name of "Application A1" also matches the search string of "Application A" and therefore is listed in addition to "Application A" as a match in the result window 1000. In some embodiments, the result window 1000 is continuously updated with matches at the time when a new match is identified. Thus, the list of matches displayed in the result window 1000 continues to grow over time as the number of matches increases. In some embodiments, the result window displays a "Save" option 1006 for saving the search results.

Figure 11:
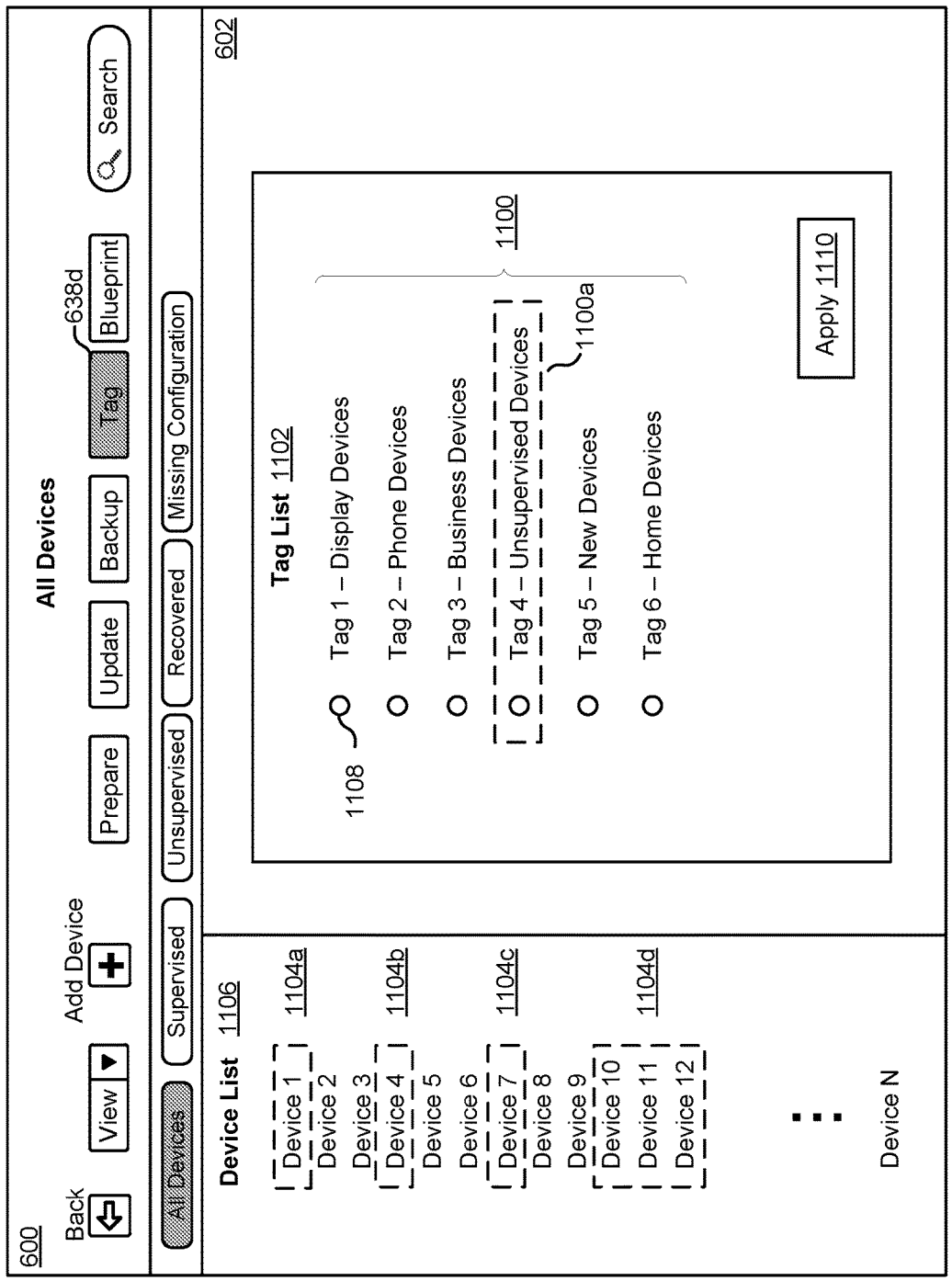
FIG. 11 illustrate displaying a plurality of devices and a list of tags available for the devices in a user interface of a device configuration application for tagging the devices, according to some embodiments.

In some embodiments, as illustrated in FIG. 11, the device configuration application UI 600 allows searching devices based on their tags. In some embodiments, the device configuration application UI 600 allows adding tags to devices. By adding a tag to a device, the device is associated with the tag. In some embodiments, adding a tag to a device connected to the electronic device 100 executing the device configuration application results in the tag being stored with the connected device. For example, the tag is stored with the connected device by storing metadata onto the connected device. Tagging multiple connected devices helps in later identifying a set of devices having similar characteristics on which a user based the decision to tag these devices. In some embodiments, a tag is persistent unless the configuration of a device, including the tag, is erased.

Referring to FIG. 11, in some embodiments, the electronic device 100 displays a plurality of device tags 1100 in a tag list 1102 in response to the selection of a "Tag" user interface element 638d of the device configuration application UI 600. In some embodiments, upon selection the "Tag" UI element 638d is visibly distinguished from the other UI elements 638a-638c, 638e. For example, as illustrated in FIG. 11, the selected "Tag" UI element 638d has a darker background color than the UI elements 638a-638c, 638e.

To create tags for devices a user first selects devices 1104 from a device selection list 1106. In the example of FIG. 11, the selected devices are "Device 1," "Device 4," "Device 7," "Device 10," "Device 11," and "Device 12," as highlighted by the dashed rectangles. In some embodiments, devices are selected in the by selecting the representations 606 of the devices in collection view window 602. Upon selecting devices for tagging, the user can specify the tags 1100 from a tag list 1102 that are to be applied to the selected devices 1104. In the example, illustrated in FIG. 11, "Tag 4—Unsupervised Devices" 1100a is selected as highlighted by the dashed rectangle. Other tags included in this example include "Tag 1—Display Device," "Tag 2—Phone Device," "Tag 4—Business Devices," "Tag 5—New Devices," and "Tag 6—Home Device." In some embodiments, each tag has a color associated and displayed by the corresponding color indicator 1108. Upon selection of the to be tagged devices and their corresponding tags, the user applies the tags to the devices. In some embodiments, the device configuration application UI 600 includes an "Apply" UI element 1110 for applying the tags to the selected devices.

In some embodiments, adding a tag to a device results in additional information being stored on the device. For example, the additional information includes information that the device has authorized access by the electronic device executing the device configuration application to the device. Thus, in some embodiments, a tag is used to lock a device so that only the device configuration application through which the tag was originally added and the electronic device running this particular device configuration application is allowed to configure the tag-locked device. A procedure to unlock a tag-locked device is described above with respect to FIG. 6B. In some embodiments, removing a tag from a device through the device configuration application UI 600, also removes the additional information from the device. Thus, in some embodiments, when a tag is removed, the device is locked and removed from access by the electronic device 100 executing the device configuration application. In some embodiments, one of the tags that is associated with a device represents the device being in a do-not-modify configuration state. A do-not-modify configuration state prevents the device configuration application from accidently configuring the corresponding device, unless a user expressly grants the permission on the device for the device to be configured.

In some embodiments, prior to receiving the search request, the electronic device 100 through the device configuration application displays representations 606 of devices connected to the electronic device, and in response to receiving the search request, filters the representations of the devices based on the search request. While displaying the filtered representations of the devices, the device configuration application then receives a request to update the configuration state of the devices represented by the filtered representations of devices. Upon receiving such update request, the device configuration application updates the configurations of the devices represented by the filtered representations without updating configurations of other devices connected to the electronic device that are not represented by the filtered representations.

In some embodiments, method 900 further includes displaying a collection view window 602 on a user interface 600 of the device configuration application for configuring a plurality of devices. The device configuration application concurrently displays representations 606 of a plurality of devices and configuration states of the plurality of devices within the collection view window 602. The representations include a representation of a first device that includes a screen image that is selected so as to represent a configuration state of the first device. The representations also include a representation of a second device that includes a screen image that is selected so as to represent a configuration state of the second device. While the first device is in a first configuration state and the second device is in a second configuration state that is different from the first configuration state, the screen image in the first representation is different from the screen image in the second representation. While displaying the user interface of the device configuration application, the device configuration application then receives the search request for information about one or more configuration states of a plurality of devices connected to the electronic device. Upon obtaining a match between the search request and the configuration state of first device, the device configuration application displays the representation of the first device, and removes from being displayed the representation of the second device and the displayed representations of the one or more searched configuration states for which no match was obtained.

3. Configuration Templates

Figure 12:
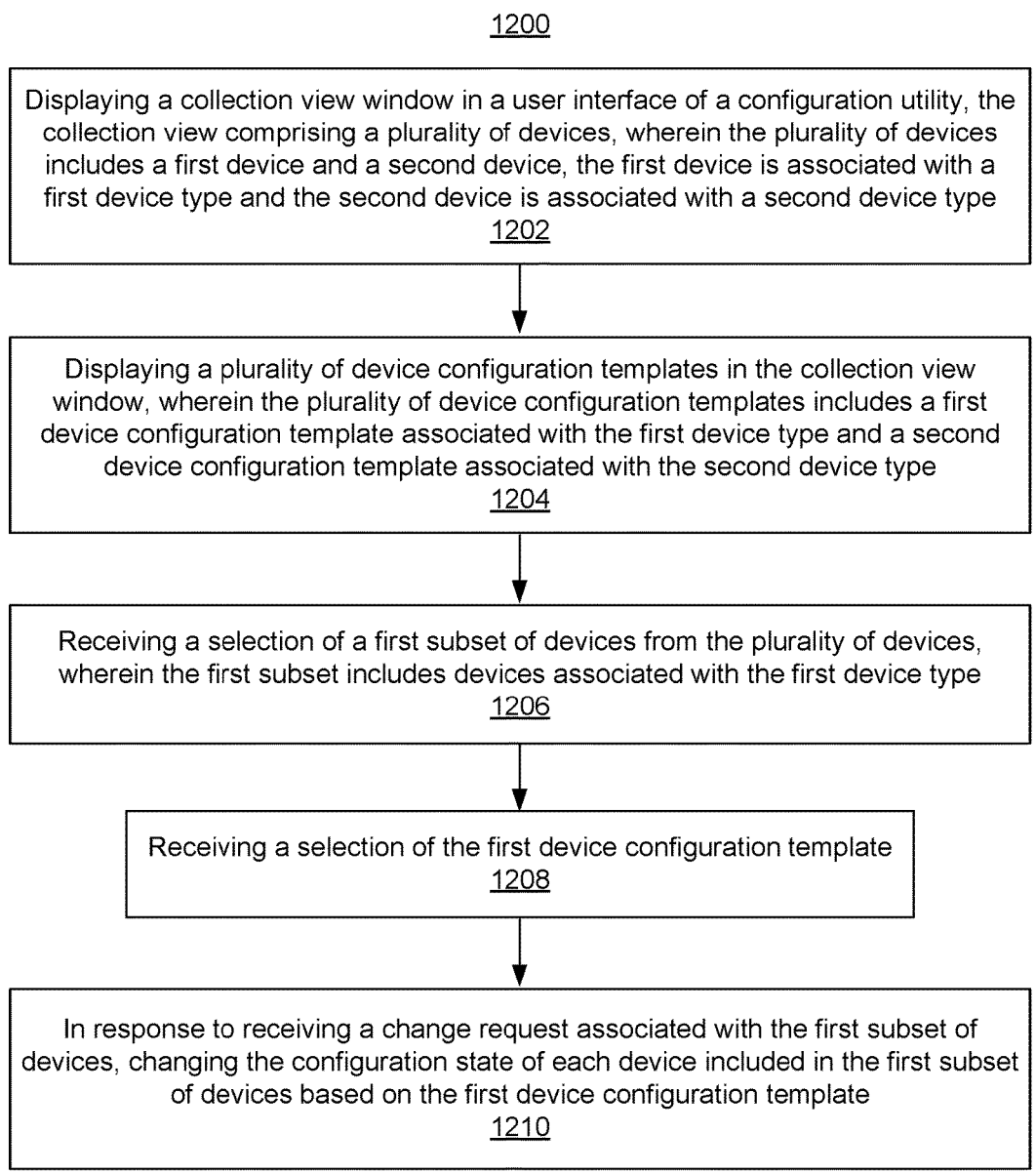
FIG. 12 is a flowchart illustrating a method 1200 using configuration templates on a user interface of an electronic device to facilitate configuring a plurality of devices, according to some embodiments.

FIG. 12 is a flowchart illustrating a method 1200 using configuration templates on a user interface of an electronic device to facilitate configuring a plurality of devices connected to the electronic device 100, according to some embodiments. The method allows the user to select multiple devices through the user interface of the device configuration application, select an indicator of a configuration template, and then apply the configuration state or settings of the configuration template to the selected devices. In addition, through its user interface the device configuration application allows displaying information about the configuration state or settings of a configuration template. In some embodiments, the device configuration application provides a method of creating a configuration template. For example, a user can specify and/or edit a set of device-independent configuration rules or parameters to be added to a configuration template for configuring a set of devices. An exemplary configuration rule includes a set of applications that are to be installed and/or kept up-to-date on a device. Another exemplary configuration rule includes the configuration of an email application on a device, e.g., the email server, accounts, etc. In some embodiments, applying the configuration template is independent of the order that the user added the configuration rules to the template. In some embodiment, a user can remove configuration rules from a configuration template. In some embodiments, the device configuration application UI includes an editor for editing the configuration templates of the device configuration application.

The method 1200 is performed at an electronic device with a display and an input device, such as the portable multifunction device 100 shown in FIG. 1A or device 300 shown in FIG. 3, as may be controlled by specially programmed code (computer programming instructions) contained in the graphics module 132, wherein such specially programmed code is not natively present in the device 300. Other embodiments of the electronic device include general-purpose computers, e.g., a desktop computer, a laptop computer, computing servers, or any similar computing devices. Some embodiments of the method 1200 may include fewer, additional, or different steps than those shown in FIG. 12, and the steps may be performed in different orders. The steps of the method 1200 are described with respect to example user interfaces illustrated in FIGS. 6A, 6B, 13, and 14.

Referring to FIGS. 12, 6A and 6B, the electronic device 100 displays 1202 a collection view window 602 on a user interface 600 of a device configuration application. The collection view window 602 includes a plurality of devices that includes a first device and a second device. The first device is associated with a first device type, e.g., a tablet device, and the second device is associated with a second device type, e.g., a phone device. In some embodiments, a device type also includes a combination of types. For example, a device type includes a phone device, a tablet device, a watch, a TV box device, a TV, a home accessory electronic device, and the like.

Figure 13:
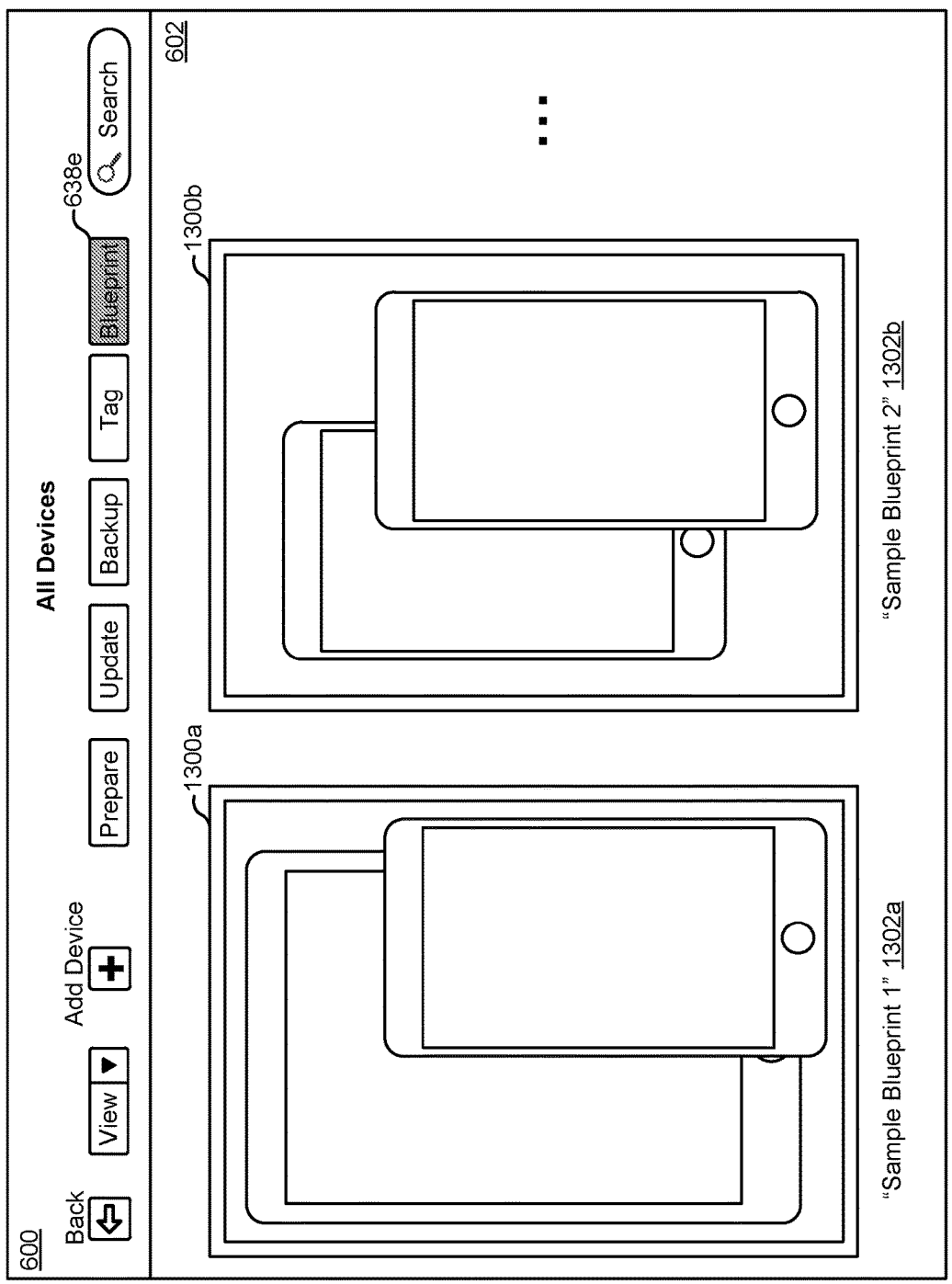
FIG. 13 illustrates displaying multiple configuration templates in the user interface of a device configuration application for configuring devices based on selecting one of the configuration templates, according to some embodiments.

Referring to FIG. 13, the electronic device 100 displays 1204 a plurality of device configuration templates 1300 in the collection view window 602. The plurality of device configuration templates 1300 includes a first device configuration template 1300*a* that is associated with the first device type and a second device configuration template 1300*b* that is associated with the second device type. In FIG. 13, for example, device configuration template "Sample Blueprint 1" 1300*a* is associated with a tablet device and a phone device, whereas template "Sample Blueprint 2" 1300*b* is only associated with phone devices. In some embodiments, the electronic device 100 displays 1204 the plurality of device configuration templates 1300 in response to the selection of an "Blueprint" user interface element 638*e* of the device configuration application UI 600. In some embodiments, upon selection the "Blueprint" UI element 638*e* is visibly distinguished from the other UI elements 638*a*-638*d*. For example, as illustrated in FIG. 13, the selected "Blueprint" UI element 638*e* has a darker background color than the UI elements 638*a*-638*d*.

The electronic device then receives 1206 a selection of a first subset of devices from the plurality of devices. This first subset includes devices associated with the first device type. The electronic device further receives 1208 a selection of the first device configuration template; and in response to receiving 1208 a change request associated with the first subset of devices, the electronic device changes 1210 the configuration state of each device included in the first subset of devices based on the first device configuration template. In some embodiments, the electronic device receives no selection of a first subset of devices prior to receiving a change request. In this case, the electronic device changes the configuration state of either all devices connected to the electronic device or a set of devices that the device configuration application considers default devices based on pre-defined device parameters. For example, applying a configuration template to the device changes the applications installed on the device, device settings, device profiles, and/or other portions of a device's configuration state.

In some embodiments, the change request includes a selection gesture with one or more configuration templates 1300 displayed within the collection view window 602. In some embodiments, a selection gesture includes a contact on a touch-sensitive surface at a location on the display corresponding to the selectable configuration template. In some embodiments, the selection gesture is clicking on the selectable configuration template 1300 with a mouse or cursor at the location on the display corresponding to the selectable configuration template. Thus, in some embodiments, the selection of the first device configuration template results in the electronic device 100 receiving the change request, which represents a one-click mechanism for selecting and configuring the first subset of devices based on the first device configuration template. In some embodiments, detecting of the change request therefore includes a single-action by a user to apply one of the plurality of configuration templates to the selected one or more devices. Furthermore, in some embodiments, the single-action by a user includes a gesture by the user on the display of the electronic device 100 with a displayed device configuration template.

In some embodiments, each device configuration template 1300 includes one or more configuration states for applications, profiles, documents, data or any combinations thereof. The device configuration templates are also independent from (target) types of the devices that are to be configured. Example target types for device configuration templates include, but are not limited to, a TV box template, a tablet device template, a combination template for tablet, phone and music player devices, a combination template for tablet and phone devices, and a generic template for all devices. In some embodiments, a configuration template includes a set of user-specified rules that are independent from the type of devices associated with the configuration template. The device configuration application then translates these device-type independent rules into the corresponding configuration state for each device that is to be configured before changing the configuration state of such device. Device-type independent rules have the advantage that the user does not need to specify separate set of configuration rules for each device for which the configuration state is changed.

Figure 14:
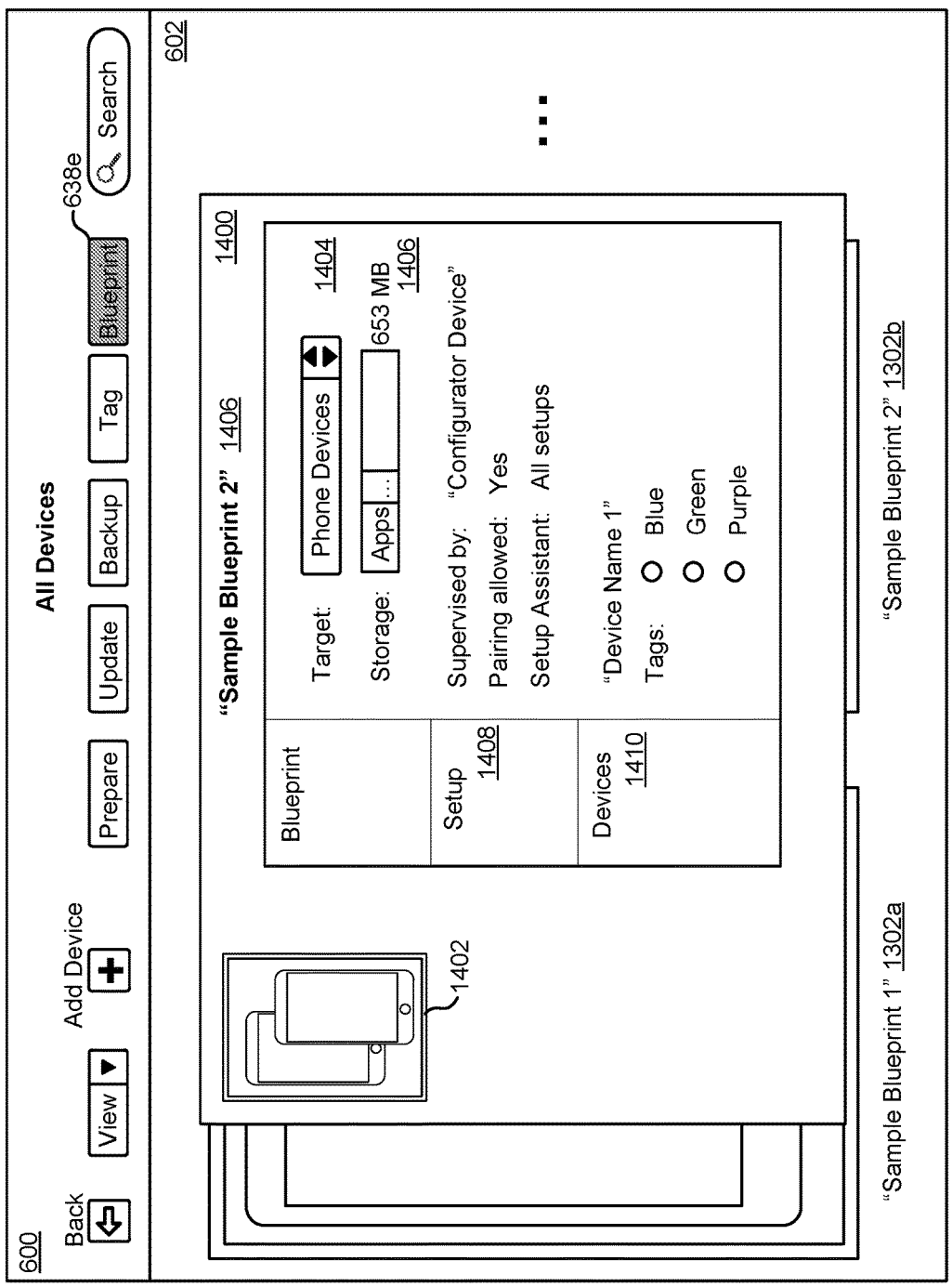
FIG. 14 illustrates displaying an information window in a user interface of a device configuration application, according to some embodiments.

In some embodiments, as illustrated in FIG. 14, the device configuration application allows for displaying an information window 1400 for each configuration template 1300. In some embodiments, the information window 1400 includes an indicator icon 1402 of the target devices of the configuration template 1300. In some embodiments, the information window 1400 includes a target selection option 1404 for selecting particular target device. In some embodiments, the target selection option 1404 includes a pull-down menu. For example, target type options include, but are not limited to, a TV box, a tablet device, a combination of tablet, phone and music player devices, a combination of tablet and phone devices, and all devices. In some embodiments, the information window 1400 includes a name of the configuration template 1406, the storage requirements 1408 for configuring devices, setup information 1410, and device information 1412. In some embodiments, the setup information 1410 includes "supervised by" information, "pairing allowed" information, "setup assistant" information, and the like. In some embodiments, the device information 1412 includes the device names and a list of tags. The list of tags indicates that only devices associated with the listed tags are configurable by the configuration template.

4. Lock Screens and QR Codes

Figure 16:
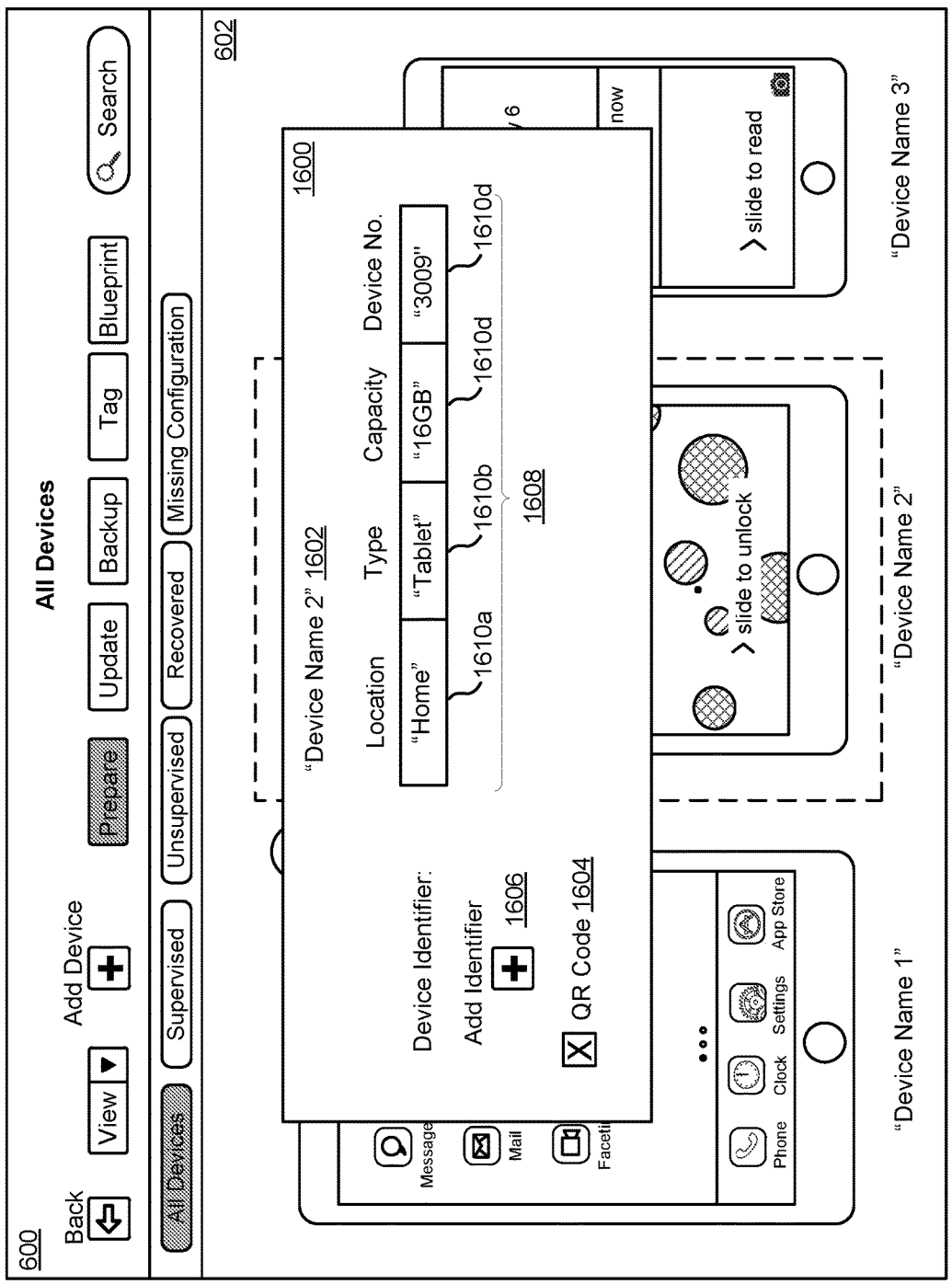
FIG. 16 illustrates an identification window in a user interface of a device configuration application for personalizing a lock screen of a device with a device identifier, according to some embodiments.
Figure 17:
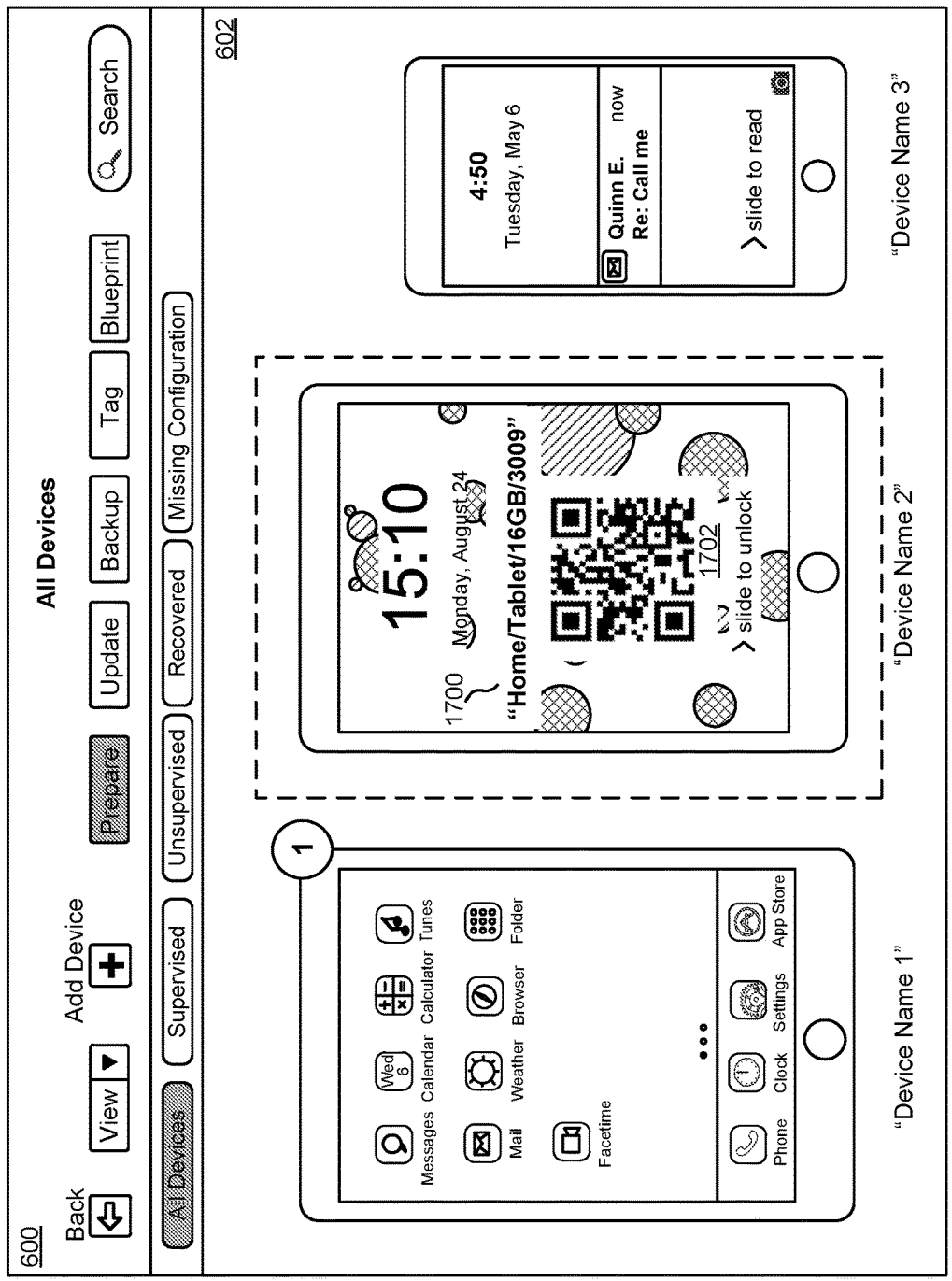
FIG. 17 illustrates personalizing a lock screen of a device that includes a device identifier in the format of a text string and Quick Response (QR) code, according to some embodiments.

FIG. 15 is a flowchart illustrating a method 1500 for changing the appearance of the user interface of a plurality of device that facilitates future configuration of the devices, according to some embodiments. In some embodiments, the method allows a user of the device configuration application to personalize the lock screen and/or home screen of devices so that the personalized devices can be identified in an efficient manner for later configuration of the devices. Besides personalizing the wallpapers of both screens, in some embodiments, the lock screen of a personalized device displays a device-identifying text string or device identifier. In some embodiments, the lock screen displays a barcode or a Quick Response (QR) code, which encodes the device-identifying text string. As illustrated in FIG. 16, a user is able to create a device-identifying text string through an identification window 1600 displayed as part of the user interface 600 of the device configuration application. The identification window 1600 includes the name of the device 1602, for which the device identifier is created. In some embodiments, the identification window includes an option to generate a QR code 1604 of the device identifier. In some embodiments, the identification window 1600 includes an "Add Identifier" option 1606. This "Add Identifier" option 1606 allows appending different component identifiers 1608 to the device identifier. Each component identifier 1608 represents a different property of a device, which includes, for example, device location, device type, device capacity, device number, and the like. For each component identifier 1608, the user is able to specify a text substring 1608 representative of the property of the device, for which the device identifier is generated. Examples for component identifiers, as illustrated in FIG. 16, include "Home" 1610*a*, "Tablet" 1610*b*, "16GB" 1610*c*, and "3009" 1610*d*. In this example, the generated device-identifying string or device identifier reads "Home/Tablet/16GB/3009" 1700, as illustrated in FIG. 17. In some embodiments, the device configuration application provides options for the text substrings for each component identifier based on the configuration states of device that are known to the device configuration application. A known device includes a device, from which the device configuration application has received its configuration state.

The method 1500 is performed at an electronic device with a display and an input device, such as the portable multifunction device 100 shown in FIG. 1A or device 300 shown in FIG. 3, as may be controlled by specially programmed code (computer programming instructions) contained in the graphics module 132, wherein such specially programmed code is not natively present in the device 300. Other embodiments of the electronic device include general-purpose computers, e.g., a desktop computer, a laptop computer, computing servers, or any similar computing devices. Some embodiments of the method 1500 may include fewer, additional, or different steps than those shown in FIG. 9, and the steps may be performed in different orders. The steps of the method 1500 are described with respect to example user interfaces illustrated in FIGS. 16, and 17.

Referring to FIGS. 15 and 16, the electronic device 100, while the electronic device is connected to a plurality of other devices that include a first device and a second device, receives 1502 a request to change an appearance of the lock screen of the plurality of devices. The request specifies a format for displaying information on the lock screens of the plurality of devices. In some embodiments, as illustrated in FIG. 16, the displayed information represents a device identifier, and the format of device identifier is a text string. In some embodiments, the request specifies the format to include a QR code of the text string. In response to receiving 1502 the request, the electronic device updates 1504 the lock screen of the first device to contain a lock screen image that includes first information in the format specified in the request.

In some embodiments, as illustrated in FIG. 17, the updated lock screen image displays a device-identifying text string 1700 and/or a QR code 1702 encoding the device-identifying text string. Furthermore, in response to receiving 1502 the request, the electronic device updates 1506 the lock screen of the second device to contain a lock screen image that includes second information in the format specified in the request, wherein the second information is different from the first information. For example, the device-identifying text string for the first device with a device number of "3009" is "Home/Tablet/16GB/3009," while it is "Home/Tablet/16GB/3010" for a second device with number "3010." Thus, in some embodiment, the format for displaying information on the lock screens of selected devices includes a fixed text string for inclusion on the first and second device. Both device identifiers are different, including their QR codes. The advantage of using different device identifiers is to be able to distinguish between individual devices. Having device identifiers that partially match, as "Home/Tablet/16GB" is common to both identifiers of the previous example, allows for grouping devices into various categories based on partially matching their device identifiers. This allows for easy cataloging and tracking of devices without requiring designated hardware to perform these tasks.

In some embodiments, the format for displaying information on the lock screens of the devices includes representations of variable data that are specific to the device on which the information is displayed. In the above example, the variable data includes different device numbers. In some embodiments, the variable data includes one or more of: a serial number of the device, a storage capacity of the device, an index value that is incremented from the value for the previously configured device, a location of the device, and a name of the device. In some embodiments, the first information is displayed as a machine-readable code on the lock screen of the first device and the second information is displayed as a machine-readable code on the lock screen of the second device. In some embodiments, machine-readable code includes a QR code, a barcode and the like.

In some embodiments, as described above, the first information is displayed as text on the lock screen of the first device and the second information is displayed as text on the lock screen of the second device. In some embodiments, the request to change an appearance of the lock screen of selected devices includes receiving selection of an image to include on the devices. For example, the request includes changing the background wallpaper of the lock screen and/or Home screen of the selected devices.

In some embodiments, the first device has a first form factor (e.g., a smartphone) and the second device has a second form factor (e.g., a tablet). For these embodiments, the request to change an appearance of the lock screen of device includes receiving instructions for positioning the image on the lock screen on devices with the first form factor and different instructions for positioning the image on the lock screen of devices with the second form factor. In some embodiments, receiving the request to change an appearance of the lock screen of the devices includes receiving selection of an option to display the device information as a machine-readable code.

The disclosure herein has been described in particular detail with respect to some embodiments. Those of skill in the art will appreciate that other embodiments optionally are practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component optionally are instead performed by multiple components, and functions performed by multiple components optionally are instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems optionally are also used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages optionally are used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks includes storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A method comprising:
at an electronic device with a display:
displaying a collection view window on a user interface of a device configuration application for configuring a plurality of devices;
concurrently displaying representations of form factors of a plurality of devices and corresponding representations of configuration states separate from the representations of form factors of the plurality of devices within the collection view window, wherein:
   a representation of a form factor of a first device indicates the form factor of the first device,
   a representation of a form factor of a second device indicates the form factor of the second device, the representation of the form factor of the second device is different from the representation of the form factor of the first device when the form factor of the second device is different from the form factor of the first device,
   a representation of a configuration state of the first device comprises a screen image that is selected so as to represent a first configuration state of the first device,
   a representation of a configuration state of the second device comprises a screen image that is selected so as to represent a second configuration state of the second device, and
   while the first device is in the first configuration state and the second device is in the second configuration state that is different from the first configuration state, the screen image in the first representation is different from the screen image in the second representation;
while displaying the user interface of the device configuration application, detecting a change in the configuration state of the first device from the first configuration state to a different configuration state; and
in response to detecting the change in the configuration state of the first device: updating the representation of the configuration state of the first device to include a screen image that represents the different configuration state instead of the screen image that represents the first configuration state.

2. The method of claim 1, wherein the representation of the form factor of the first device is based on physical properties of the first device and the representation of the form factor of the second device is based on physical properties of the second device.

3. The method of claim 1, wherein the screen image representing the first configuration state of the first device comprises a pre-defined default image.

4. The method of claim 1, further comprising, while displaying the representations of form factors and configuration states of the plurality of devices:
receiving a request to add one or more additional representations of form factors and configuration states to the collection view window; and
in response to receiving the request: reducing a size of one or more representations of form factors and configuration states in the plurality of representations of form factors and configuration states to accommodate the display of the one or more additional representations of form factors and configuration states, and displaying the one or more additional representations of form factors and configuration states to the collection view window.

5. The method of claim 1, further comprising:
displaying a number of available updates for one or more devices of the plurality of devices, and in response to selecting one or more of the number of available updates for one or more devices of the plurality of devices, updating the one or more devices with the selected one or more of the number of available updates, the updates comprising an update to applications configured on the one or more devices, an update to the computer operating system on the one or more devices, or any combination thereof.

6. The method of claim 1, further comprising:
while one or more devices of the plurality of devices are selected, and one or more devices of the plurality of devices are unselected, and in response to detecting an update request, updating the selected one or more devices in accordance with the update request without updating the unselected devices.

7. The method of claim 1, further comprising:
while one or more devices of the plurality of devices are selected, and one or more devices of the plurality of devices are unselected, and in response to detecting a backup request, backing up configuration information of the one or more selected devices in accordance with the backup request without backing up the unselected devices.

8. The method of claim 1, further comprising:
while one or more devices of the plurality of devices are selected, and one or more devices of the plurality of devices are unselected, and in response to detecting a configuration information request, displaying configuration information of the one or more selected devices on the user interface of the device configuration application in accordance with the configuration information request without displaying configuration information of the unselected devices.

9. The method of claim 1, further comprising, in response to detecting a configuration information request:
displaying an option to further inquiry into the displayed configuration information of the one or more selected devices.

10. A non-transitory computer-readable storage medium including instructions to cause an electronic device with a display to perform steps of:
displaying a collection view window on a user interface of a device configuration application for configuring a plurality of devices;
concurrently displaying representations of form factors of a plurality of devices and corresponding representations of configuration states separate from the representations of form factors of the plurality of devices within the collection view window, wherein:
a representation of a form factor of a first device indicates the form factor of the first device,
a representation of a form factor of a second device indicates the form factor of the second device, the representation of the form factor of the second device is different from the representation of the form factor of the first device when the form factor of the second device is different from the form factor of the first device,
a representation of a configuration state of the first state comprises a screen image that is selected so as to represent a first configuration state of the first device,
a representation of a configuration state of the second device comprises a screen image that is selected so as to represent a second configuration state of the second device, and
while the first device is in the first configuration state and the second device is in the second configuration state that is different from the first configuration state, the screen image in the first representation is different from the screen image in the second representation;
while displaying the user interface of the device configuration application, detecting a change in the configuration state of the first device from the first configuration state to a different configuration state; and
in response to detecting the change in the configuration state of the first device: updating the representation of the configuration state of the first device to include a screen image that represents the different configuration state instead of the screen image that represents the first configuration state.

11. The non-transitory computer readable storage medium of claim 10, wherein the representation of the form factor of the first device is based on physical properties of the first device and the representation of the form factor of the second device is based on physical properties of the second device.

12. The non-transitory computer readable storage medium of claim 10, wherein the screen image representing the configuration state of the first device comprises a predefined default image.

13. The non-transitory computer readable storage medium of claim 10, further comprising instructions to perform steps including, while displaying the representations of form factors and configuration states of the plurality of devices:
receiving a request to add one or more additional representations of form factors and configuration states to the collection view window; and
in response to receiving the request: reducing a size of one or more representations of form factors and configuration states in the plurality of representations of form factors and configuration states to accommodate the display of the one or more additional representations of form factors and configuration states, and displaying the one or more additional representations of form factors and configuration states in the collection view window.

14. The non-transitory computer readable storage medium of claim 10, further comprising instructions to perform steps including:
displaying a number of available updates for one or more devices of the plurality of devices, and in response to selecting one or more of the number of available updates for one or more devices of the plurality of devices, updating the one or more devices with the selected one or more of the number of available updates, the updates comprising an update to applications configured on the one or more devices, an update to the computer operating system on the one or more devices, or any combination thereof.

15. The non-transitory computer readable storage medium of claim 10, further comprising instructions to perform steps including:
while one or more devices of the plurality of devices are selected, and one or more devices of the plurality of devices are unselected, and in response to detecting an update request, updating the selected one or more devices in accordance with the update request without updating the unselected devices.

16. The non-transitory computer readable storage medium of claim 10, further comprising instructions to perform steps including:
while one or more devices of the plurality of devices are selected, and one or more devices of the plurality of devices are unselected, and in response to detecting a backup request, backing up configuration information of the one or more selected devices in accordance with the backup request without backing up the unselected devices.

17. The non-transitory computer readable storage medium of claim 10, further comprising instruction to perform steps including:
while one or more devices of the plurality of devices are selected, and one or more devices of the plurality of devices are unselected, and in response to detecting a configuration information request, displaying configuration information of the one or more selected devices on the user interface of the device configuration application in accordance with the configuration information request without displaying configuration information of the unselected devices.

18. The non-transitory computer readable storage medium of claim 10, further comprising instructions to perform steps including, in response to detecting a configuration information request: displaying an option to further inquiry into the displayed configuration information of the one or more selected devices.

19. An electronic device with a display a non-transitory computer readable storage medium, and a processor, wherein the non-transitory computer readable storage medium includes instructions causing the processor to perform steps of:
displaying a collection view window on a user interface of a device configuration application for configuring a plurality of devices;
concurrently displaying representations of form factors of a plurality of devices and corresponding representations of configuration states separate from the representations of form factors of the plurality of devices within the collection view window, wherein:
a representation of a form factor of a first device indicates the form factor of the first device,
a representation of a form factor of a second device indicates the form factor of the second device, the representation of the form factor of the second device is different from the representation of the form factor of the first device when the form factor of the second device is different from the form factor of the first device,
a representation of a configuration state of the first device comprises a screen image that is selected so as to represent a first configuration state of the first device,
a representation of a configuration state of the second device comprises a screen image that is selected so as to represent a second configuration state of the second device, and
while the first device is in the first configuration state and the second device is in the second configuration state that is different from the first configuration state, the screen image in the first representation is different from the screen image in the second representation;
while displaying the user interface of the device configuration application, detecting a change in the configuration state of the first device from the first configuration state to a different configuration state; and
in response to detecting the change in the configuration state of the first device: updating the representation of the configuration state of the first device to include a screen image that represents the different configuration state instead of the screen image that represents the first configuration state.

20. The electronic device of claim 19, wherein the representation of the form factor of the first device is based on physical properties of the first device and the representation of the form factor of the second device is based on physical properties of the second device.

* * * * *